(12) United States Patent
Dharmaraju et al.

(10) Patent No.: US 9,198,084 B2
(45) Date of Patent: Nov. 24, 2015

(54) WIRELESS ARCHITECTURE FOR A TRADITIONAL WIRE-BASED PROTOCOL

(75) Inventors: Dinesh Dharmaraju, San Diego, CA (US); Ranganathan Krishnan, San Diego, CA (US); Lauren KwanKit Leung, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 815 days.

(21) Appl. No.: 11/624,642

(22) Filed: Jan. 18, 2007

(65) Prior Publication Data

US 2008/0037506 A1    Feb. 14, 2008

Related U.S. Application Data

(60) Provisional application No. 60/809,068, filed on May 26, 2006, provisional application No. 60/833,564, filed on Jul. 26, 2006, provisional application No. 60/833,565, filed on Jul. 26, 2006.

(51) Int. Cl.
*H04M 11/00* (2006.01)
*H04J 1/16* (2006.01)
*H04W 28/22* (2009.01)

(52) U.S. Cl.
CPC ...................................... *H04W 28/22* (2013.01)

(58) Field of Classification Search
USPC .................. 455/554.2, 405; 370/252, 386
See application file for complete search history.

(56) References Cited

U.S. PATENT DOCUMENTS

| | | | |
|---|---|---|---|
| 4,791,554 | A | 12/1988 | Hirota et al. |
| 5,828,370 | A | 10/1998 | Moeller et al. |
| 5,835,723 | A | 11/1998 | Andrews et al. |
| 5,925,137 | A | 7/1999 | Okanoue et al. |

(Continued)

FOREIGN PATENT DOCUMENTS

| CN | 1437355 A | 8/2003 |
|---|---|---|
| CN | 1561609 A | 1/2005 |

(Continued)

OTHER PUBLICATIONS

Euihyeok Kwon et al: "An idle timeslot reuse scheme for IEEE 802.15.3 high-rate wireless personal area networks" Vehicular Technology Conference, 2005. VTC-2005-Fall. 2005 IEEE 62nd Dallas, TX, USA Sep. 25-28, 2005, Piscataway, NJ, USA, IEEE, Sep. 25, 2005, pp. 715-719, XP010878576.

(Continued)

*Primary Examiner* — Joel Ajayi
(74) *Attorney, Agent, or Firm* — Brian Lambert

(57) ABSTRACT

Embodiments are described in connection with transferring data traditionally communicated through a wired link over a high-speed wireless link. The disclosed embodiments provide the wired and/or wireless data communication with minimal changes on the existing wired architecture. According to an embodiment is an apparatus for communicating wirelessly over a traditional wired link. The apparatus includes a transmitter comprising a host and a first portion of a client connected by a wired link and a receiver comprising a second portion of the client. According to some embodiments, the apparatus can include a query module that determines an operation rate based in part on a rate supported by a medium access control and a retransmission statistic and an assigner module that assigns a communication to a wired protocol or a wireless protocol.

26 Claims, 13 Drawing Sheets

(56) References Cited

U.S. PATENT DOCUMENTS

| | | | |
|---|---|---|---|
| 6,014,706 A | 1/2000 | Cannon et al. | |
| 6,049,549 A * | 4/2000 | Ganz et al. | 370/449 |
| 6,195,680 B1 | 2/2001 | Goldszmidt et al. | |
| 6,252,889 B1 | 6/2001 | Patki et al. | |
| 6,266,690 B1 | 7/2001 | Shankarappa et al. | |
| 6,400,720 B1 | 6/2002 | Ovadia et al. | |
| 6,424,626 B1 * | 7/2002 | Kidambi et al. | 370/236 |
| 6,515,992 B1 | 2/2003 | Weston et al. | |
| 6,594,699 B1 | 7/2003 | Sahai et al. | |
| 6,608,841 B1 | 8/2003 | Koodli | |
| 6,748,195 B1 | 6/2004 | Phillips | |
| 6,760,772 B2 | 7/2004 | Zou et al. | |
| 6,801,530 B1 | 10/2004 | Brandt et al. | |
| 6,876,857 B1 | 4/2005 | Nee et al. | |
| 6,917,976 B1 | 7/2005 | Slaughter et al. | |
| 6,963,921 B1 | 11/2005 | Yang et al. | |
| 7,035,281 B1 | 4/2006 | Spearman et al. | |
| 7,072,984 B1 | 7/2006 | Polonsky et al. | |
| 7,080,151 B1 | 7/2006 | Borella et al. | |
| 7,085,420 B2 | 8/2006 | Mehrotra | |
| 7,324,462 B1 | 1/2008 | Page et al. | |
| 7,328,021 B1 * | 2/2008 | Satapathy | 455/445 |
| 7,333,464 B2 | 2/2008 | Yang et al. | |
| 7,366,204 B2 | 4/2008 | Kang et al. | |
| 7,373,415 B1 | 5/2008 | DeShan et al. | |
| 7,376,155 B2 | 5/2008 | Ahn et al. | |
| 7,477,659 B1 | 1/2009 | Nee et al. | |
| 7,519,470 B2 * | 4/2009 | Brasche et al. | 701/207 |
| 7,529,823 B2 | 5/2009 | Trufinescu et al. | |
| 7,565,357 B2 | 7/2009 | Rao | |
| 7,688,859 B2 | 3/2010 | Chen et al. | |
| 7,696,980 B1 | 4/2010 | Piot et al. | |
| 7,712,670 B2 | 5/2010 | Sauerwein, Jr. et al. | |
| 7,716,385 B2 | 5/2010 | Saint-Hilaire et al. | |
| 7,719,972 B2 | 5/2010 | Yuan et al. | |
| 7,720,096 B2 | 5/2010 | Klemets | |
| 7,768,536 B2 | 8/2010 | Hyatt | |
| 7,835,406 B2 | 11/2010 | Oran et al. | |
| 7,881,315 B2 | 2/2011 | Haveson et al. | |
| 7,929,475 B2 | 4/2011 | Simonson et al. | |
| 8,001,384 B2 | 8/2011 | Yamamoto et al. | |
| 8,102,849 B2 | 1/2012 | Martinez Bauza et al. | |
| 8,157,168 B2 | 4/2012 | Sauerwein, Jr. et al. | |
| 8,364,201 B1 | 1/2013 | Fujisaki | |
| 8,406,961 B2 | 3/2013 | Pathak et al. | |
| 8,428,048 B2 | 4/2013 | Walker et al. | |
| 8,437,347 B2 | 5/2013 | Casaccia et al. | |
| 8,466,870 B2 | 6/2013 | Cohen et al. | |
| 8,517,251 B2 | 8/2013 | Cohen et al. | |
| 8,593,996 B2 | 11/2013 | Lee et al. | |
| 8,605,048 B2 | 12/2013 | Ye et al. | |
| 8,605,584 B2 | 12/2013 | Leung et al. | |
| 8,612,619 B2 | 12/2013 | Guo et al. | |
| 8,724,696 B2 | 5/2014 | Byford et al. | |
| 8,966,131 B2 | 2/2015 | Huang et al. | |
| 2002/0007494 A1 | 1/2002 | Hodge | |
| 2002/0035621 A1 | 3/2002 | Zintel et al. | |
| 2002/0097718 A1 | 7/2002 | Korus et al. | |
| 2003/0031152 A1 | 2/2003 | Gohda et al. | |
| 2003/0033417 A1 | 2/2003 | Zou et al. | |
| 2003/0064752 A1 | 4/2003 | Adachi et al. | |
| 2003/0110297 A1 | 6/2003 | Tabatabai et al. | |
| 2003/0142631 A1 * | 7/2003 | Silvester | 370/252 |
| 2003/0152098 A1 | 8/2003 | Zhu | |
| 2003/0167171 A1 | 9/2003 | Calderone et al. | |
| 2003/0225737 A1 | 12/2003 | Mathews | |
| 2004/0039934 A1 | 2/2004 | Land et al. | |
| 2004/0071169 A1 | 4/2004 | Abe et al. | |
| 2004/0083284 A1 | 4/2004 | Ofek et al. | |
| 2004/0103282 A1 | 5/2004 | Meier et al. | |
| 2004/0147264 A1 | 7/2004 | Ogawa | |
| 2004/0160967 A1 | 8/2004 | Fujita et al. | |
| 2004/0202249 A1 | 10/2004 | Lo et al. | |
| 2004/0214571 A1 | 10/2004 | Hong | |
| 2005/0021810 A1 | 1/2005 | Umemura et al. | |
| 2005/0044142 A1 | 2/2005 | Garrec et al. | |
| 2005/0058090 A1 | 3/2005 | Chang et al. | |
| 2005/0060750 A1 | 3/2005 | Oka et al. | |
| 2005/0085239 A1 | 4/2005 | Cedervall | |
| 2005/0096086 A1 | 5/2005 | Singamsetty | |
| 2005/0102699 A1 | 5/2005 | Kim et al. | |
| 2005/0111361 A1 * | 5/2005 | Hosein | 370/230 |
| 2005/0130611 A1 | 6/2005 | Lu et al. | |
| 2005/0136990 A1 | 6/2005 | Hardacker et al. | |
| 2005/0138193 A1 | 6/2005 | Encarnacion et al. | |
| 2005/0144225 A1 | 6/2005 | Anderson et al. | |
| 2005/0149976 A1 | 7/2005 | Lupoi et al. | |
| 2005/0152330 A1 | 7/2005 | Stephens et al. | |
| 2005/0166241 A1 | 7/2005 | Kim et al. | |
| 2005/0175321 A1 | 8/2005 | Aridome et al. | |
| 2005/0176429 A1 | 8/2005 | Lee et al. | |
| 2005/0184993 A1 | 8/2005 | Ludwin et al. | |
| 2005/0198663 A1 | 9/2005 | Chaney et al. | |
| 2005/0219266 A1 | 10/2005 | Koutani et al. | |
| 2005/0266798 A1 | 12/2005 | Moloney et al. | |
| 2005/0267946 A1 | 12/2005 | An et al. | |
| 2006/0002320 A1 | 1/2006 | Costa-Requena et al. | |
| 2006/0002395 A1 | 1/2006 | Araki et al. | |
| 2006/0013182 A1 * | 1/2006 | Balasubramanian et al. | 370/343 |
| 2006/0028398 A1 | 2/2006 | Willmore | |
| 2006/0050640 A1 * | 3/2006 | Jin et al. | 370/235 |
| 2006/0053459 A1 | 3/2006 | Simerly et al. | |
| 2006/0058003 A1 | 3/2006 | Lee | |
| 2006/0069797 A1 | 3/2006 | Abdo et al. | |
| 2006/0098593 A1 | 5/2006 | Edvardsen et al. | |
| 2006/0101146 A1 | 5/2006 | Wang | |
| 2006/0103508 A1 | 5/2006 | Sato | |
| 2006/0133414 A1 | 6/2006 | Luoma et al. | |
| 2006/0136963 A1 | 6/2006 | Oh et al. | |
| 2006/0146009 A1 | 7/2006 | Syrbe et al. | |
| 2006/0187964 A1 * | 8/2006 | Li et al. | 370/474 |
| 2006/0198448 A1 | 9/2006 | Aissi et al. | |
| 2006/0199537 A1 | 9/2006 | Eisenbach | |
| 2006/0202809 A1 | 9/2006 | Lane et al. | |
| 2006/0203805 A1 | 9/2006 | Karacali-Akyamac et al. | |
| 2006/0206340 A1 | 9/2006 | Silvera et al. | |
| 2006/0209787 A1 | 9/2006 | Okuda | |
| 2006/0218298 A1 | 9/2006 | Knapp et al. | |
| 2006/0222246 A1 | 10/2006 | Murai et al. | |
| 2006/0223442 A1 * | 10/2006 | Stephens | 455/67.11 |
| 2006/0233191 A1 * | 10/2006 | Pirzada et al. | 370/463 |
| 2006/0236250 A1 | 10/2006 | Gargi | |
| 2006/0256851 A1 | 11/2006 | Wang et al. | |
| 2006/0268869 A1 | 11/2006 | Boers et al. | |
| 2006/0270417 A1 | 11/2006 | Chi | |
| 2006/0288008 A1 | 12/2006 | Bhattiprolu et al. | |
| 2007/0004387 A1 | 1/2007 | Gadamsetty et al. | |
| 2007/0008922 A1 | 1/2007 | Abhishek et al. | |
| 2007/0016654 A1 | 1/2007 | Bowles et al. | |
| 2007/0022195 A1 | 1/2007 | Kawano et al. | |
| 2007/0037600 A1 | 2/2007 | Fukuda | |
| 2007/0043550 A1 | 2/2007 | Tzruya | |
| 2007/0057865 A1 | 3/2007 | Song et al. | |
| 2007/0057885 A1 | 3/2007 | Kurumisawa et al. | |
| 2007/0061433 A1 | 3/2007 | Reynolds et al. | |
| 2007/0104215 A1 | 5/2007 | Wang et al. | |
| 2007/0126715 A1 | 6/2007 | Funamoto | |
| 2007/0141984 A1 | 6/2007 | Kuehnel et al. | |
| 2007/0141988 A1 | 6/2007 | Kuehnel et al. | |
| 2007/0157283 A1 | 7/2007 | Setlur et al. | |
| 2007/0162945 A1 | 7/2007 | Mills | |
| 2007/0171910 A1 | 7/2007 | Kumar et al. | |
| 2007/0182728 A1 | 8/2007 | Fujimori | |
| 2007/0211041 A1 | 9/2007 | Lai et al. | |
| 2007/0259662 A1 | 11/2007 | Lee et al. | |
| 2007/0264988 A1 | 11/2007 | Wilson, Jr. et al. | |
| 2007/0264991 A1 | 11/2007 | Jones et al. | |
| 2007/0274400 A1 | 11/2007 | Murai et al. | |
| 2007/0291636 A1 | 12/2007 | Rajagopal et al. | |
| 2007/0292135 A1 | 12/2007 | Guo et al. | |
| 2007/0299778 A1 | 12/2007 | Haveson et al. | |
| 2008/0005348 A1 | 1/2008 | Kosiba et al. | |
| 2008/0013658 A1 | 1/2008 | Lewis et al. | |
| 2008/0018657 A1 | 1/2008 | Montag | |

(56) References Cited

U.S. PATENT DOCUMENTS

| | | |
|---|---|---|
| 2008/0031210 A1 | 2/2008 | Abhishek et al. |
| 2008/0037785 A1 | 2/2008 | Gantman et al. |
| 2008/0045149 A1 | 2/2008 | Dharmaraju et al. |
| 2008/0046944 A1 | 2/2008 | Lee et al. |
| 2008/0109763 A1 | 5/2008 | Lee |
| 2008/0115183 A1 | 5/2008 | Zato et al. |
| 2008/0129879 A1 | 6/2008 | Shao et al. |
| 2008/0130612 A1 | 6/2008 | Gorokhov et al. |
| 2008/0155057 A1 | 6/2008 | Khedouri et al. |
| 2008/0198847 A1 | 8/2008 | Yamagishi et al. |
| 2008/0198848 A1 | 8/2008 | Yamagishi |
| 2008/0205394 A1 | 8/2008 | Deshpande et al. |
| 2008/0211766 A1 | 9/2008 | Westerman et al. |
| 2008/0231595 A1 | 9/2008 | Krantz et al. |
| 2008/0232402 A1 | 9/2008 | Higuchi et al. |
| 2008/0270532 A1 | 10/2008 | Billmaier et al. |
| 2008/0273485 A1 | 11/2008 | Tsigler et al. |
| 2008/0291863 A1 | 11/2008 | Agren |
| 2008/0304408 A1 | 12/2008 | Kraemer et al. |
| 2008/0307349 A1 | 12/2008 | Wang et al. |
| 2008/0310391 A1 | 12/2008 | Schneidman et al. |
| 2009/0002263 A1 | 1/2009 | Pasetto |
| 2009/0010259 A1 | 1/2009 | Sirotkin |
| 2009/0013081 A1 | 1/2009 | Laroia et al. |
| 2009/0031035 A1 | 1/2009 | Dharmaraju et al. |
| 2009/0070404 A1 | 3/2009 | Mazzaferri |
| 2009/0083431 A1 | 3/2009 | Balachandran et al. |
| 2009/0089453 A1 | 4/2009 | Bohan et al. |
| 2009/0091656 A1 | 4/2009 | Kitaru et al. |
| 2009/0094317 A1 | 4/2009 | Venkitaraman |
| 2009/0102838 A1 | 4/2009 | Bullard et al. |
| 2009/0109974 A1 | 4/2009 | Shetty et al. |
| 2009/0133122 A1 | 5/2009 | Koo et al. |
| 2009/0141180 A1 | 6/2009 | Kondo et al. |
| 2009/0141692 A1 | 6/2009 | Kasslin et al. |
| 2009/0147139 A1 | 6/2009 | Watanabe et al. |
| 2009/0153737 A1 | 6/2009 | Glen |
| 2009/0162029 A1 | 6/2009 | Glen |
| 2009/0189860 A1 | 7/2009 | Su et al. |
| 2009/0191926 A1 | 7/2009 | Doyle |
| 2009/0201423 A1 | 8/2009 | Sugiyama et al. |
| 2009/0252130 A1 | 10/2009 | Sheth et al. |
| 2009/0288125 A1 | 11/2009 | Morioka |
| 2009/0300676 A1 | 12/2009 | Harter, Jr. |
| 2009/0323562 A1 | 12/2009 | Cho et al. |
| 2010/0027467 A1 | 2/2010 | Wu et al. |
| 2010/0073334 A1 | 3/2010 | Cohen et al. |
| 2010/0105334 A1 | 4/2010 | Terry et al. |
| 2010/0118200 A1 | 5/2010 | Gelman et al. |
| 2010/0123826 A1 | 5/2010 | Sagi |
| 2010/0127847 A1 | 5/2010 | Evans et al. |
| 2010/0134312 A1 | 6/2010 | Park et al. |
| 2010/0146143 A1 | 6/2010 | Thorup |
| 2010/0146583 A1 | 6/2010 | Prehofer et al. |
| 2010/0153553 A1 | 6/2010 | Sheth et al. |
| 2010/0166017 A1 | 7/2010 | Na et al. |
| 2010/0172320 A1 | 7/2010 | Suzuki |
| 2010/0189131 A1 | 7/2010 | Branam et al. |
| 2010/0199187 A1 | 8/2010 | Lin et al. |
| 2010/0205321 A1 | 8/2010 | Martinez Bauza et al. |
| 2010/0245296 A1 | 9/2010 | Sip et al. |
| 2010/0257238 A1 | 10/2010 | Jeon et al. |
| 2010/0257450 A1 | 10/2010 | Go et al. |
| 2010/0281103 A1 | 11/2010 | Imai et al. |
| 2010/0289871 A1 | 11/2010 | Tatsuta et al. |
| 2010/0289872 A1 | 11/2010 | Funabiki et al. |
| 2010/0293287 A1 | 11/2010 | Kobayashi |
| 2010/0306344 A1 | 12/2010 | Athas et al. |
| 2011/0002255 A1 | 1/2011 | Dharmaraju et al. |
| 2011/0019620 A1 | 1/2011 | Wang |
| 2011/0037447 A1 | 2/2011 | Mair |
| 2011/0051602 A1 | 3/2011 | Matthews et al. |
| 2011/0069720 A1 | 3/2011 | Jacobs et al. |
| 2011/0072473 A1 | 3/2011 | Funabiki et al. |
| 2011/0107388 A1 | 5/2011 | Lee et al. |
| 2011/0115818 A1 | 5/2011 | Chung et al. |
| 2011/0128442 A1 | 6/2011 | Blanchard et al. |
| 2011/0145879 A1 | 6/2011 | Rajamani et al. |
| 2011/0149806 A1 | 6/2011 | Verma et al. |
| 2011/0157470 A1 | 6/2011 | Tsuruga et al. |
| 2011/0164058 A1 | 7/2011 | Lemay |
| 2011/0167176 A1 | 7/2011 | Yew et al. |
| 2011/0167181 A1 | 7/2011 | Minoo et al. |
| 2011/0182195 A1 | 7/2011 | Oikawa |
| 2011/0186138 A1 | 8/2011 | Hanna et al. |
| 2011/0205433 A1 | 8/2011 | Altmann |
| 2011/0216239 A1 | 9/2011 | Raveendran |
| 2011/0216785 A1 | 9/2011 | Begen et al. |
| 2011/0216829 A1 | 9/2011 | Raveendran |
| 2011/0281557 A1 | 11/2011 | Choi et al. |
| 2011/0314168 A1 | 12/2011 | Bathiche et al. |
| 2012/0036543 A1 | 2/2012 | George et al. |
| 2012/0036549 A1 | 2/2012 | Patel et al. |
| 2012/0038825 A1 | 2/2012 | Kanonich |
| 2012/0044985 A1 | 2/2012 | Tao et al. |
| 2012/0060100 A1 | 3/2012 | Sherwood et al. |
| 2012/0084670 A1 | 4/2012 | Momchilov |
| 2012/0099566 A1 | 4/2012 | Laine et al. |
| 2012/0113113 A1 | 5/2012 | Hong |
| 2012/0147799 A1 | 6/2012 | Nagara et al. |
| 2012/0154386 A1 | 6/2012 | Nagara et al. |
| 2012/0162537 A1 | 6/2012 | Maddali et al. |
| 2012/0249575 A1 | 10/2012 | Krolczyk et al. |
| 2013/0002949 A1 | 1/2013 | Raveendran et al. |
| 2013/0003621 A1 | 1/2013 | Huang et al. |
| 2013/0003622 A1 | 1/2013 | Huang et al. |
| 2013/0003623 A1 | 1/2013 | Raveendran et al. |
| 2013/0003624 A1 | 1/2013 | Huang et al. |
| 2013/0009873 A1 | 1/2013 | Huang et al. |
| 2013/0009887 A1 | 1/2013 | Huang et al. |
| 2013/0009996 A1 | 1/2013 | Raveendran et al. |
| 2013/0013318 A1 | 1/2013 | Huang et al. |
| 2013/0033435 A1 | 2/2013 | Raveendran et al. |
| 2013/0033496 A1 | 2/2013 | Raveendran et al. |
| 2013/0047189 A1 | 2/2013 | Raveendran et al. |
| 2013/0128948 A1 | 5/2013 | Rabii et al. |
| 2013/0139210 A1 | 5/2013 | Huang et al. |
| 2013/0174208 A1 | 7/2013 | Lee et al. |
| 2013/0188632 A1 | 7/2013 | Sheth et al. |
| 2013/0195119 A1 | 8/2013 | Huang et al. |
| 2013/0215142 A1 | 8/2013 | Park |
| 2013/0222301 A1 | 8/2013 | Lee et al. |
| 2013/0227152 A1 | 8/2013 | Lee et al. |
| 2013/0234913 A1 | 9/2013 | Thangadorai et al. |
| 2013/0238702 A1 | 9/2013 | Sheth et al. |
| 2013/0246565 A1 | 9/2013 | Froelicher et al. |
| 2013/0246665 A1 | 9/2013 | Lee et al. |
| 2013/0272628 A1 | 10/2013 | Lee |
| 2013/0297936 A1 | 11/2013 | Khosravi et al. |
| 2013/0304794 A1 | 11/2013 | Verma et al. |
| 2014/0019653 A1 | 1/2014 | Amchislavsky et al. |
| 2014/0022146 A1 | 1/2014 | Thangadorai et al. |
| 2014/0096164 A1 | 4/2014 | Bei et al. |
| 2014/0120829 A1 | 5/2014 | Bhamidipati et al. |
| 2014/0210693 A1 | 7/2014 | Bhamidipati et al. |
| 2014/0372620 A1 | 12/2014 | Vedula et al. |

FOREIGN PATENT DOCUMENTS

| | | |
|---|---|---|
| CN | 1592884 A | 3/2005 |
| CN | 1596004 A | 3/2005 |
| CN | 1656750 A | 8/2005 |
| CN | 1662944 A | 8/2005 |
| CN | 1774106 A | 5/2006 |
| CN | 1832481 A | 9/2006 |
| CN | 1893356 A | 1/2007 |
| CN | 1983945 A | 6/2007 |
| CN | 101002453 A | 7/2007 |
| CN | 101018330 A | 8/2007 |
| CN | 101083825 A | 12/2007 |
| CN | 101247249 A | 8/2008 |
| CN | 101247250 A | 8/2008 |
| EP | 1206080 A1 | 5/2002 |
| EP | 1233326 | 8/2002 |

(56) References Cited

FOREIGN PATENT DOCUMENTS

| | | |
|---|---|---|
| EP | 1235392 A1 | 8/2002 |
| EP | 1325591 A1 | 7/2003 |
| EP | 1333373 A1 | 8/2003 |
| EP | 1385336 A2 | 1/2004 |
| EP | 1423778 A2 | 6/2004 |
| EP | 1507369 A1 | 2/2005 |
| EP | 1517228 A2 | 3/2005 |
| EP | 1550264 A1 | 7/2005 |
| EP | 1653678 | 5/2006 |
| EP | 1944946 | 7/2008 |
| EP | 1959685 A2 | 8/2008 |
| EP | 1959686 A2 | 8/2008 |
| EP | 2012461 | 1/2009 |
| EP | 2037683 | 3/2009 |
| EP | 2190202 A1 | 5/2010 |
| GB | 2383920 A | 7/2003 |
| JP | H06110424 A | 4/1994 |
| JP | H07104722 A | 4/1995 |
| JP | H07129364 A | 5/1995 |
| JP | H07240806 A | 9/1995 |
| JP | H08237628 A | 9/1996 |
| JP | H09325923 A | 12/1997 |
| JP | 2000278320 A | 10/2000 |
| JP | 2000354031 A | 12/2000 |
| JP | 2001034250 A | 2/2001 |
| JP | 2001282673 A | 10/2001 |
| JP | 2001352533 A | 12/2001 |
| JP | 2002064725 A | 2/2002 |
| JP | 2002142210 A | 5/2002 |
| JP | 2002165248 A | 6/2002 |
| JP | 2002262341 A | 9/2002 |
| JP | 2002330381 A | 11/2002 |
| JP | 2003050761 A | 2/2003 |
| JP | 2003102060 A | 4/2003 |
| JP | 2003124991 A | 4/2003 |
| JP | 2003143237 A | 5/2003 |
| JP | 2003271279 A | 9/2003 |
| JP | 2003304523 A | 10/2003 |
| JP | 2004054783 A | 2/2004 |
| JP | 2004505531 A | 2/2004 |
| JP | 2004086550 A | 3/2004 |
| JP | 2004120441 A | 4/2004 |
| JP | 2004192140 A | 7/2004 |
| JP | 2004199454 A | 7/2004 |
| JP | 2004265329 A | 9/2004 |
| JP | 2004274159 A | 9/2004 |
| JP | 2004531916 | 10/2004 |
| JP | 2005049666 A | 2/2005 |
| JP | 2005515714 A | 5/2005 |
| JP | 2005142808 A | 6/2005 |
| JP | 2005148450 A | 6/2005 |
| JP | 2005204016 A | 7/2005 |
| JP | 2006500860 A | 1/2006 |
| JP | 2006060448 A | 3/2006 |
| JP | 2006060589 A | 3/2006 |
| JP | 2006060596 A | 3/2006 |
| JP | 2006100885 A | 4/2006 |
| JP | 2006514353 A | 4/2006 |
| JP | 2006121562 A | 5/2006 |
| JP | 2006155327 A | 6/2006 |
| JP | 2006172423 A | 6/2006 |
| JP | 2006197401 A | 7/2006 |
| JP | 2006254328 A | 9/2006 |
| JP | 2006285302 A | 10/2006 |
| JP | 2007043685 A | 2/2007 |
| JP | 2007082070 A | 3/2007 |
| JP | 2007505580 A | 3/2007 |
| JP | 2007088539 A | 4/2007 |
| JP | 2007508783 A | 4/2007 |
| JP | 2007206644 A | 8/2007 |
| JP | 2007271908 A | 10/2007 |
| JP | 2007274150 A | 10/2007 |
| JP | 2007282219 A | 10/2007 |
| JP | 2007316405 A | 12/2007 |
| JP | 2008508600 A | 3/2008 |
| JP | 2008079139 A | 4/2008 |
| JP | 2008191929 A | 8/2008 |
| JP | 2008293361 A | 12/2008 |
| JP | 2008301249 A | 12/2008 |
| JP | 2008547264 A | 12/2008 |
| JP | 2009021698 A | 1/2009 |
| JP | 2009502067 A | 1/2009 |
| JP | 2009033348 A | 2/2009 |
| JP | 2009071580 A | 4/2009 |
| JP | 2009083896 A | 4/2009 |
| JP | 2009147893 A | 7/2009 |
| JP | 2009537051 A | 10/2009 |
| JP | 2010033548 A | 2/2010 |
| JP | 2010068537 A | 3/2010 |
| JP | 2010098344 A | 4/2010 |
| JP | 2010178147 A | 8/2010 |
| JP | 2012044746 A | 3/2012 |
| JP | 2012525773 A | 10/2012 |
| JP | 2014507862 A | 3/2014 |
| KR | 100398610 B1 | 9/2003 |
| KR | 1020050007533 | 1/2005 |
| KR | 20060060717 | 6/2006 |
| KR | 20080065633 A | 7/2008 |
| RU | 2207723 C1 | 6/2003 |
| RU | 2005113275 A | 10/2005 |
| RU | 2269873 C2 | 2/2006 |
| TW | 496058 | 7/2002 |
| TW | I234954 | 6/2005 |
| TW | I239179 | 9/2005 |
| TW | 200618653 | 6/2006 |
| TW | 200838310 A | 9/2008 |
| TW | 200943168 A | 10/2009 |
| WO | WO 0184291 A1 | 11/2001 |
| WO | WO02010942 | 2/2002 |
| WO | 0223825 A1 | 3/2002 |
| WO | WO0249314 A2 | 6/2002 |
| WO | 03030451 A1 | 4/2003 |
| WO | 03061240 A1 | 7/2003 |
| WO | WO-03104834 A2 | 12/2003 |
| WO | 2004030351 A1 | 4/2004 |
| WO | 2004034646 A1 | 4/2004 |
| WO | 2004051962 A1 | 6/2004 |
| WO | WO-2005107187 A1 | 11/2005 |
| WO | WO-2005109781 A1 | 11/2005 |
| WO | WO2005122509 | 12/2005 |
| WO | 2006007352 A1 | 1/2006 |
| WO | 2006020304 A2 | 2/2006 |
| WO | WO 2006135289 A1 | 12/2006 |
| WO | 2007009876 A1 | 1/2007 |
| WO | WO2007000757 | 1/2007 |
| WO | 2007013334 A1 | 2/2007 |
| WO | WO2007021269 | 2/2007 |
| WO | WO-2007033049 A2 | 3/2007 |
| WO | 2007098425 A1 | 8/2007 |
| WO | 2007133483 A1 | 11/2007 |
| WO | 2008027724 A1 | 3/2008 |
| WO | 2008087713 A1 | 7/2008 |
| WO | 2009015322 A2 | 1/2009 |
| WO | 2009040918 A1 | 4/2009 |
| WO | 2010120878 A2 | 10/2010 |
| WO | 2010126727 A2 | 11/2010 |
| WO | 2011002141 A1 | 1/2011 |
| WO | 2011003089 A1 | 1/2011 |
| WO | 2012096546 A2 | 7/2012 |

OTHER PUBLICATIONS

Zhanping Yin et al: "Third-party handshake protocol for efficient peer discovery in IEEE 802.15.3 WPANs" Broadband Networks, 2005 2nd International Conference on Boston, MA Oct. 3-7, 2005, Piscataway, NJ, USA IEEE, Oct. 3, 2005, pp. 902-911, XP010890303.

Apple, Safari Web Content Guide, Chapter 6, Handling Events, Oct. 12, 2011, retrieved from http://developer.apple.com/library/safari/#documentation/AppleApplications/Reference/SafariWebContent/HandlingEvents/HandlingEvents.html.

Brandenburg, et al., AVTCore, RTCP for inter-destination media syncronization, Internet Draft, draft-ietf-avtcore-idms-092.txt, Oct. 31, 2011.

(56) References Cited

OTHER PUBLICATIONS

MSDN DirectShow, retrieved Nov. 28, 2011 from: http://msdn.microsoft.com/en-us/library/dd375454(VS.85).aspx.
MSDN Windows Sockets 2, retrieved Nov. 28, 2011 from: http://msdn.microsoft.com/en-us/library/ms740673(VS.85).aspx.
Shoji Y., et al., "Research and Standardization activty for IEEE802.15.3c mmW WPAN: (2) Target applications and Usage Models", IEICE Tech. Rep., vol. 106, No. 555, RCS2006-279, pp. 179-182, Feb. 2007.
Dorot, V.et al.: "An Explanatory Dictionary of Modern Computer Terms," 2nd Edition, bhv, Saint Petersburg, 2001, 'Program Product' on p. 339.
McKnight et al. (TPRC 30th Research Conference on Communication, Information and Internet Policy, Aug. 2002) Virtual Markets in Wireless Grids: Peering Policy Obstacles, hereinafter referred as McKnight, pp. 1 and 20.
Myers, et al: "Collaboration Using Multiple PDAS Connected to a PC," Proceedings of the ACM Conference on Computer Supported Cooperative Work (CSCW), Nov. 14, 1998, pp. 285-294, ISBN: 978-1-58113-009-6.
Basso et al., "RTP Payload Format for MPEG-4 Streams; draft-ietf-avt-mpeg4-multisi-03.txt", vol. avt, No. 3, Nov. 1, 2001, XP015015620, ISSN: 0000-0004.
Doerffel T., "User manual iTALC—Intelligent Teaching and Learning with Computers Version 1.0.4", Jan. 29, 2008, pp. 1-17, XP55025785, Retrieved from the Internet: URL:http://italc.sourceforge.net/italc-manual-2007-01-29.pdf [retrieved on Apr. 26, 2012] the whole document.
Media Content Distribution (MCD); 3D 1-30 Gaming Graphics Delivery Overview, Technical Report, European Telecommunications Standards Institute (ETSI), 650, Route Des Lucioles ; F-06921 Sophia-Antipolis ; France, vol . MCD, No. V1. 1. 1, Dec. 1, 2010, XP014061814, section 5.
Mihai Mitrea et al: "Novel approaches to 1-30 remote display representations: BiFS-based solution and its deployment within the FP7 MobiThin project", 87. MPEG Meeting; Feb. 2, 2009-Jun. 2, 2009; Lausanne; (Motion Picture Expert Group or ISO/IEC JTC1/SC29/WG11),, No. M16058, Jan. 29, 2009, XP030044655, sections 2 and 3.
Nave I et al., "Games@large graphics streaming architecture", Consumer Electronics, 2008. ISCE 2008. IEEE International Symposium on, IEEE, Piscataway, NJ, USA, Apr. 14, 2008, pp. 1-4, XP031283619, ISBN: 978-1-4244-2422-1 abstract col. 2-col. 6.
Schulzrinne, et al., "RTP: A Transport Protocol for Real-Time Applications", rfc3550.txt, Jul. 1, 2003, XP015009332, ISSN: 0000-0003.
Wenger et al., "RTP Payload Format for H.264 Video," Network Working Group, RFC 3984, Feb. 2005, 78 pp.
Helmy A: "Architectural framework for large-scale multicast in mobile ad hoc networks" Proceedings of IEEE International Conference on Communications—Apr. 28-May 2, 2002—New York, NY, USA, IEEE, Piscataway, NJ, USA LNKDDOI: 10.1109/ICC.2002.997206, vol. 4, Apr. 28, 2002, pp. 2036-2042, XP010589844 ISBN: 978-0-7803-7400-3.
IEEE 802.15.3, "Part 15.3: Wireless Medium Access Control (MAC) and Physical Layer (PHY) Specifications for High Rate Wireless Personal Area Networks (WPANs)," IEEE Computer Society, 2003.
International Search Report—PCT/US07/069813, International Search Authority—European Patent Office, Jan. 18, 2008.

Miller B., et al., "Mapping salutation architecture APIs to Bluetooth service discovery layer," Bluetooth White Paper, [Online} pp. 1-25, Jul. 1, 1999, XP002511956.
Nordbotten, N.A. et al., "Methods for service discovery in Bluetooth scatternets," Computer Communications, Elsevier Science Publishers BV, Amsterdam, NL, vol. 27, No. 11, Jul. 1, 2004, pp. 1087-1096, XP004503638.
Written Opinion—PCT/US2007/069813, International Search Authority, European Patent Office, Jan. 18, 2008.
Video Electronics Standards Association (VESA) "Mobile Display Digital Interface Standard (MDDI)," Jul. 2004.
Co-pending U.S. Appl. No. 10/236,657, filed Sep. 6, 2002.
Casner, S., et al., "Compressing IP/UDP/RTP Headers for Low-Speed Serial Links," IETF Network Working Group, RFC 2508 (Feb. 1999).
Gentric., et al., "RTP Payload Format for MPEG-4 Streams", Internet Engineering Task Force, draft-ietf-avt-mpeg4-multisl-03.txt, Nov. 2001, pp. 13,14,25 and 33.
Handley, M. et al., "SDP: Session Description Protocol" Network Working Group, Request for Comments: 2327, Category: Standards Track. ISI/LBNL, Apr. 1998, pp. 1-42.
"Bluetooth Specification Version 1.1" published Feb. 22, 2001; Section 1 pp. 41-42; Section 2.1, p. 43; Section 4.1-2, pp. 47-50; Section 10.9, p. 120; and Section 11, pp. 126-137.
Byungjoo Lee, U.S. Appl. No. 61/433,942, filed Jan. 18, 2011.
DDJ., "Research on Windows Programming with Visual C++, Final Issue, Overcoming WIN32 Hook Processing in MFC Programming", Feb. 1996 issue (vol. 5, No. 2, No. 61 in all), Shoeisha Co., Ltd., Feb. 1, 1996, pp. 66-77.
International Preliminary Report on Patentability—PCT/US2013/020155, The International Bureau of WIPO—Geneva, Switzerland, Jul. 17, 2014.
Hayakawa A., "Operate multiple machines by remote control software", VNCThing, Mac Power, Japan, ASCII Corporation, Jun. 1, 2003, vol. 14, No. 6, p. 86.
Kinoshita K., "The Software" Everyone knows, Read this and everything will be clear, Standard software with freedom., Mac Fan, Japan, Mainichi Communications Inc., Sep. 1, 2007, vol. 15, No. 9, p. 212-219.
"Raster Graphics" Wikipedia. Wikimedia Foundation, Jan. 29, 2011, Web, Apr. 1, 2015. <http://en.wikipedia.org/w/index.php?title=Raster_graphics&oldid=41 0775304>.
Ryo Yamaichi, Good to Remember! "Wisdom" for Troubleshooting, 68th Windows Q & A Hotline, Windows Server World, Japan, IDG Japan, Inc., Oct. 1, 2009, vol. 14, No. 10, pp. 104-107.
Wikipedia entry for UPnP List of UPnP AV media servers and clients (captured Aug. 20, 2010), pp. 1-10, Retrieved from the Internet <URL: web.archive.org/web/20100820133238/http://en.wikipedia.org/wiki/List_of_UPnP_AV_media_servers_and_clients>, whole document.
Wikipedia entry of header (captured Aug. 30, 2010), 1 Page, Retrieved from the Internet <URL: web.archive.org/web/20100830154156/http://en.wikipedia.org/wiki/Header_(computing)>, whole document.

* cited by examiner

WIRELESS ARCHITECTURE FOR A TRADITIONAL WIRE-BASED PROTOCOL

CROSS REFERENCE TO RELATED APPLICATIONS

This application claims the benefit under 35 U.S.C. §119 (e) of U.S. Provisional Application Ser. No. 60/809,068, filed May 26, 2006, entitled WIRELESS ARCHITECTURE FOR A TRADITIONAL WIRE-BASED PROTOCOL; Provisional Application Ser. No. 60/833,564, filed Jul. 26, 2006, entitled WIRELESS ARCHITECTURE FOR A TRADITIONAL WIRE-BASED PROTOCOL; and Provisional Application Ser. No. 60/833,565, filed Jul. 26, 2006, entitled WIRELESS ARCHITECTURE FOR A TRADITIONAL WIRE-BASED PROTOCOL, the entirety of these applications are incorporated herein by reference. This application is related to application Ser. No. 11/624,634, filed Jan. 18, 2007, entitled WIRELESS ARCHITECTURE FOR A TRADITIONAL WIRE-BASED PROTOCOL that has the same filing date, same inventors and same assignee as this application.

BACKGROUND

I. Field

The following description relates generally to communication systems and more particularly to enabling traditional wire-based devices to communicate over a wireless link and/or a wired link.

II. Background

Wireless networking systems are utilized by many to communicate wherever the user may be located at a particular time (e.g., home, office, traveling, . . . ). Wireless communication devices have become smaller and more powerful (e.g., increased functionality and/or applications, larger memory capacity) to meet user needs while improving portability and convenience. Users have found many uses for wireless communication devices including cellular telephones, personal digital assistants (PDAs) and the like. For example, wireless communication devices can include functionality to capture and process images (e.g., still images, moving images, video gaming, and the like).

Applications and/or functionalities that operate utilizing very high data rates can have substantial power requirements and/or high current levels. Such power requirements and/or current levels are readily available for devices that communicate utilizing a wired protocol. However, wireless communication systems may not have the capability to operate utilizing the high data rates. Thus, the communication a user desires to send and/or receive can be limited in some situations.

Some devices have traditionally only operated in a wired capacity, such as, for example, a Mobile Display Digital Interface (MDDI). Thus, a user having such a device may not be able to communicate while mobile and may need to expend further costs to obtain a wireless device, which may not always be feasible. In some situations, a user may decide to operate two devices, one with wired capacity and one with wireless capacity to achieve the benefits of both devices. However, the costs associated with two devices, as well as keeping track of both devices, might impose an undue burden on a user.

To overcome the aforementioned as well as other deficiencies, provided is a technique for allowing a traditionally wired-based protocol to communicate over either the wired architecture or a wireless architecture. The disclosed techniques provide such flexibility with minimal changes to the wired architecture.

SUMMARY

The following presents a simplified summary of one or more embodiments in order to provide a basic understanding of some aspects of such embodiments. This summary is not art extensive overview of the one or more embodiments, and is intended to neither identify key or critical elements of the embodiments nor delineate the scope of such embodiments. Its sole purpose is to present some concepts of the described embodiments in a simplified form as a prelude to the more detailed description that is presented later.

In accordance with one or more embodiments and corresponding disclosure thereof, various aspects are described in connection with transferring data traditionally communicated through a wired link over a high-speed wireless link. The disclosed embodiments provide the wired and/or wireless data communication with minimal changes on the existing wired architecture.

According to an embodiment is a method for determining an operate rate for transferring data traditionally sent by a wired link over a high-speed wireless link. The method includes querying a host for an available application data rate and measuring a round trip delay rate. A forward link rate and a reverse link rate are ascertained based on die measured round trip delay rate. An operation rate is computed based in part on the ascertained forward link rate and reverse link rate. The operation rate can be communicated to a receiver (e.g., mobile device). Computing an operation rate can include determining whether the forward link rate or the reverse link rate is the lower rate and designating that lower rate as the operation rate. According to some embodiments, the computation can include comparing the forward link rate, the reverse link rate, the available application data rate of a host, and a maximum capacity of a client to determine the lowest rate, which is assigned as the operation rate. According to some embodiments, a minimum allowable rate is established and the operation rate is adjusted if it is below the minimum allowable rate.

According to another embodiment is a method for configuring a traditionally wired device to communicate either through a wired protocol or through a wireless protocol. The method includes placing a first portion of a client on a sender, placing a second portion of the client on a receiver, and providing wired functionality and wireless functionality at the receiver. The method can include connecting the sender to a data source and interfacing the first portion of the client to a host included on the sender with a wired link.

According to another embodiment is an apparatus for communicating wirelessly over a traditional wired link. The apparatus includes a transmitter comprising a host and a first portion of a client connected by a wired link and a receiver comprising a second portion of the client. According to some embodiments, the apparatus can include a query module that determines an operation rate based in part on a rate supported by a medium access control and a retransmission statistic and an assigner module that assigns a communication to a wired protocol or a wireless protocol.

According to another embodiment is a mobile device for communicating over a wired link or a wireless link. The mobile device includes means for receiving an operation rate for a communication, means for communicating over a wireless link, and means for communicating over a wired link. The mobile device also includes means for selectively determining whether to utilize the wireless link or the wired link based in part on the received operation rate. According to some embodiments, the means for selectively determining whether to utilize the wireless link or the wired link based in part on the received operation rate can further determine whether to switch between the wireless link and the wired link.

According to another embodiment is a method for communicating in a low-overhead mode through a wired or a wireless link. The method includes placing forward link data in a buffer, requesting unidirectional channel time allocations (CTAs) and sending the forward link data. According to some embodiments, the method can include placing reverse link data in a buffer, requesting reverse direction CTAs, sending the reverse link data and communicating data to a host in a reverse encapsulation packet.

According to another embodiment is a method for communicating in a low-latency mode through either a wired link or a wireless link. The method includes requesting a CTA for m msec in a forward direction and for n msec in a reverse direction and comparing the forward direction CTA to the reverse direction CTA. According to some embodiments, the method includes sending reverse link data during CTAs reserved for a reverse direction and deriving a time duration of a MAC frame.

According to another embodiment is a computer readable medium having computer-executable instructions for contacting a host for an application data rate that the host provides and calculating a round trip delay. The instruction can include determining a forward link rate and a reverse link rate based in part on the calculated round trip delay and ascertaining an operation rate based in part on the determined forward link rate and reverse link rate. According to some embodiments, the instructions include determining a lowest rate of the forward link rate, the reverse link rate, the application data rate that the host provides, and a maximum capacity of a client. The determined lowest rate can be designated as the operation rate and this rate can be sent to a receiver.

According to another embodiment is a processor that executes instructions for communicating over a wired link or a wireless link. The instructions include receiving a communication operation rate and selectively determining whether to communicate over a wired link or a wireless link based in part on the received communication operation rate.

To the accomplishment of the foregoing and related ends, one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
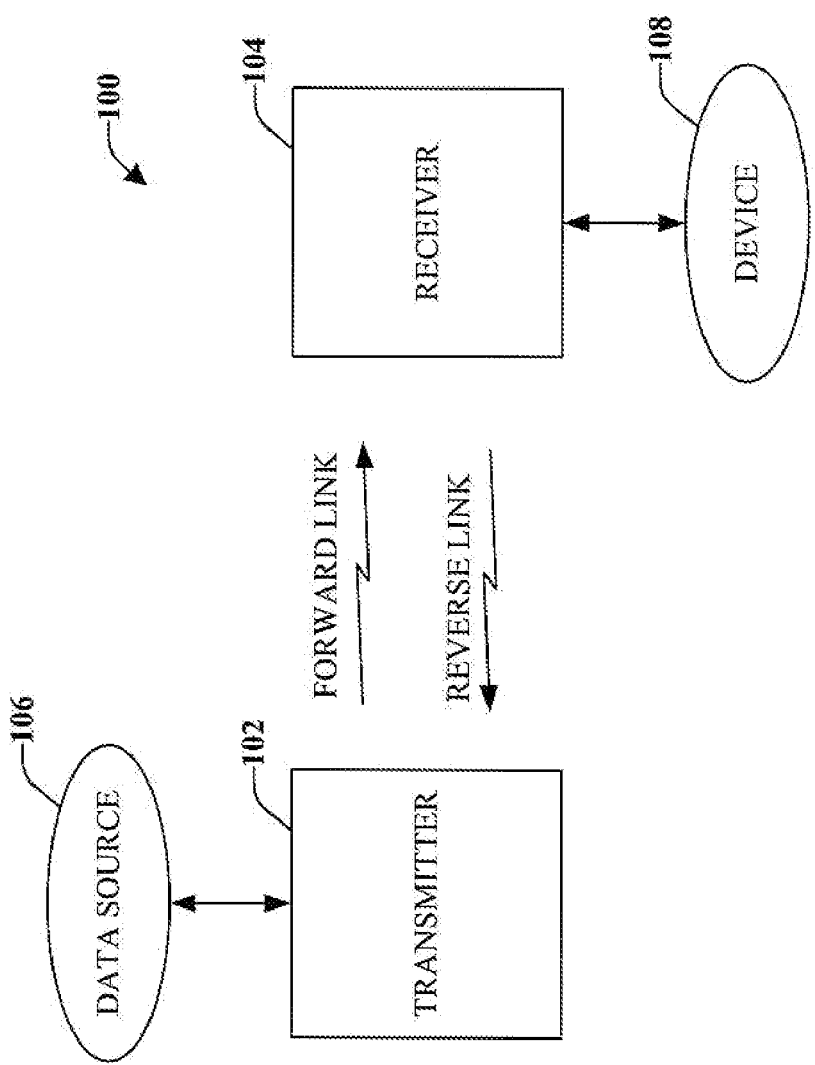
FIG. 1 illustrates a block diagram of a system for enabling a traditional wire-based device to communicate wirelessly.

Various embodiments are now described with reference to the drawings. In the following description, for purposes of explanation, numerous specific details are set forth in order to provide a thorough understanding of one or more aspects. It may be evident, however, that such embodiment(s) may be practiced without these specific details. In other instances, well-known structures and devices are shown in block diagram form in order to facilitate describing these embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network, such as the Internet with other systems by way of the signal).

Furthermore, various embodiments are described herein in connection with a user device. A user device can also be called a system, a subscriber unit, subscriber station, mobile station, mobile device, remote station, access point, base station, remote terminal, access terminal, handset, user terminal, terminal, user agent, or user equipment. A user device can be a cellular telephone, a cordless telephone, a Session Initiation Protocol (SIP) phone, a wireless local loop (WLL) station, a PDA, a handheld device having wireless connection capability, or other processing device(s) connected to a wireless modem.

Moreover, various aspects or features described herein may be implemented as a method, apparatus, or article of manufacture using standard, programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

In the following detailed description, various aspects and embodiments may be described in the context of a Mobile Display Digital Interface (MDDI) and/or Institute of Electrical and Electronics Engineers (IEEE) 802.15.3 medium access control (MAC) layer. While these inventive aspects may be well suited for use with the disclosed embodiments, those skilled in the art will readily appreciate that these inventive aspects are likewise applicable for use in various other traditionally wire based protocols. Accordingly, any reference to an MDDI and/or IEEE 802.15.3 MAC is intended only to illustrate the inventive aspects, with the understanding that such inventive aspects have a wide range of applications.

Various embodiments will be presented in terms of systems that may include a number of components, modules, and the like. It is to be understood and appreciated that the various systems may include additional components, modules, etc. and/or may not include all of the components, module etc. discussed in connection with the figures. A combination of these approaches may also be used. In addition, the various systems can be implemented in a plurality of mobile devices (e.g., cellular phones, smart phones, laptops, handheld communication devices, handheld computing devices, satellite radios, global positioning systems, PDAs, and/or other suitable devices).

With reference now to the drawings, FIG. 1 illustrates a block diagram of a system 100 for enabling a traditional wire-based device to communicate wirelessly. System 100 includes a transmitter 102 in wired and/or wireless communication with a receiver 104. Transmitter 102 and receiver 104 can be components that traditionally communicate over a wire-based protocol. Although a number of transmitter(s) 102 and receiver(s) 104 can be included in system 100, as will be appreciated, a single transmitter 102 that transmits communication data signals to a single receiver 104 is illustrated for purposes of simplicity.

The communication sent from transmitter 102 to receiver 104 is referred to as the forward link and the communication sent from receiver 104 to transmitter 102 is referred to as the reverse link. Transmitter 102 may be connected to a data source 106 (e.g., storage, memory, and the like) and receiver 104 may be connected to an interface device 108, such as a display.

System 100 can operate in at least two modes of operation, namely, a low overhead mode and/or a low latency mode. Low overhead mode optimizes a packet sent over the air (e.g., wirelessly) by requesting channel allocation time(s), which is the time for data to be sent from either direction (from sender to receiver or from receiver to sender). In low latency mode, the channel allocation time(s) can be determined based on knowledge of the data included in both the forward link and the reverse link.

Transmitter 102 can be configured to ascertain a forward link rate and reverse link rate based on various criteria (e.g., round trip delay measurements). Transmitter 102 can send at least one reverse link encapsulation packet every frame. The reverse link encapsulation packet can be used to accommodate the transfer of reverse packets over the transfer link, creating the reverse link.

Receiver 104 can be configured to receive and/or send data communication through a wired functionality and/or a wireless functionality. The determination of which functionality to utilize can be based on various criteria including type of data (e.g., voice, text, image, . . . ), the traditional method of communicating the data (e.g., wired link or wireless link), the size of the file or packet being transmitted, as well as other criteria relating to the data, the sender, and/or the receiver. Transmitter 102 can communicate the data without knowledge of how receiver 104 is receiving the data (e.g., wired or wireless).

Figure 2:
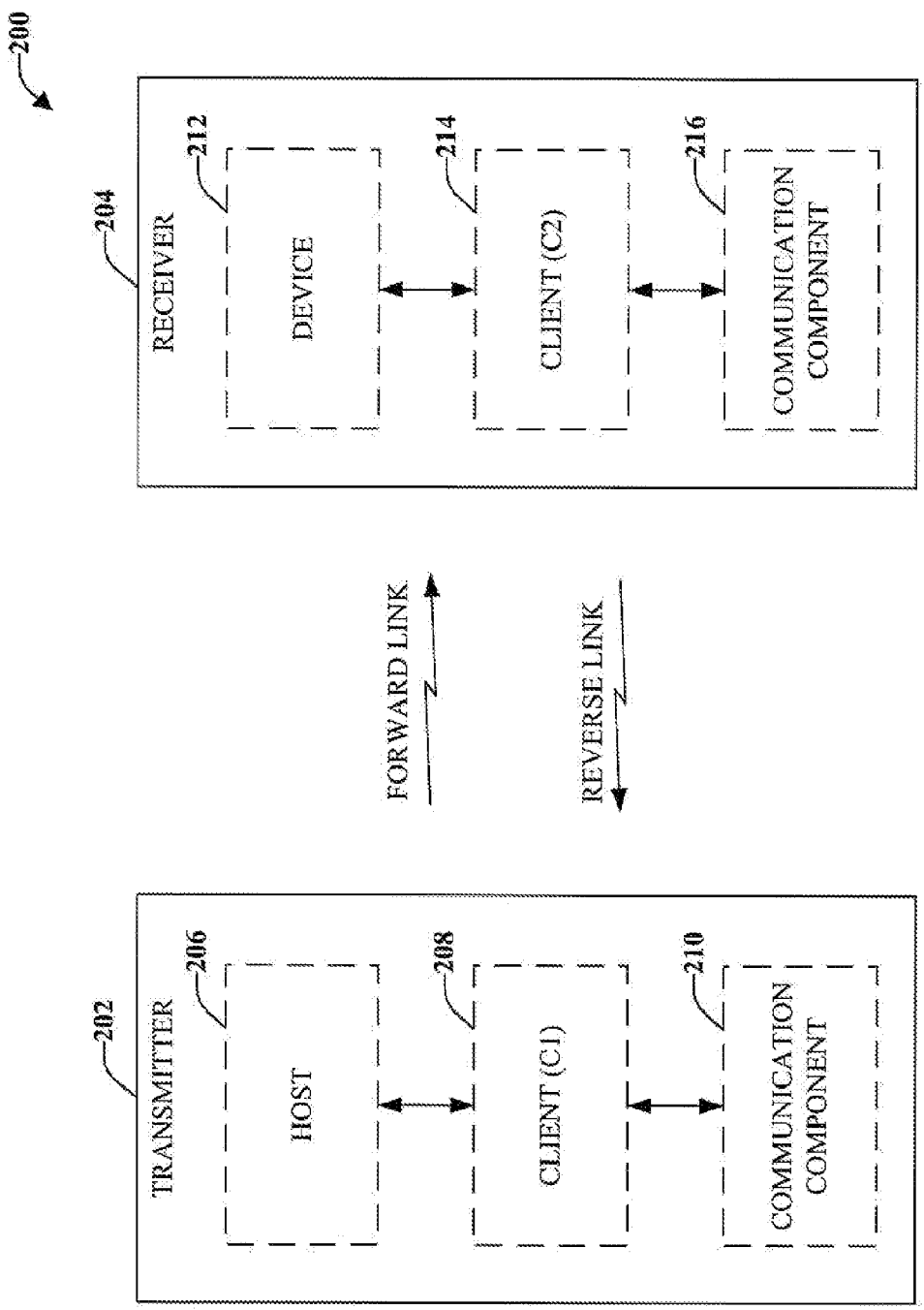
FIG. 2 illustrates a system for extending the capabilities of a traditionally wired configuration to allow communication over a wireless link.

FIG. 2 illustrates a system 200 for extending the capabilities of a traditionally wired configuration to allow communication over a wireless link. System 200 includes a transmitter 202 that communicates with a receiver 204 over a forward link. Receiver 204 communicates with the transmitter 202 over a reverse link. Transmitter 202 and receiver 204 can be devices that generally communicate over a wired protocol, however, system 200 allows such devices to communicate over the wired protocol and/or over a wireless protocol, such as over a high-speed wireless link. Although a number of transmitter(s) 202 and receiver(s) 204 can be included in system 200, as will be appreciated, a single transmitter 202 that transmits communication data signals to a single receiver 204 is illustrated for purposes of simplicity.

Transmitter 202 can include a host 206, a portion of a client (C1) 208, and a communication component 210. Host 206 can be an MDDI host, for example. In some embodiments, host 206 can be a component separate from transmitter 202 and connected to transmitter 202 through a wired link. A portion of client (C1) 20S is kept on or in communication with host 206 for clock synchronization. Client (C1) 208 can be connected to host 206 through a traditional wired link (e.g., MDDI link), for example. Host 206 can be configured to send or communicate packets of data to client (C1) 208. These packets can be communicated to receiver 204 through communication component 210, which can include a modem, such as an ultra wide band (UWB) modem. Some packets (e.g., MDDI round-trip delay measurement packets) are processed by client (C1) 208 and communicated to receiver 204. Other packets (e.g., filler packets) should be dropped by client (C1) 208 and not communicated to receiver 204. That is to say, some packets should not be transmitted on either the forward wireless link or the reverse wireless link. A filler packet, for example, maintains timing between transmitter 202 and receiver 204. Such packets can be generated by either transmitter 202 or receiver 204 through respective client portions.

Receiver 204 can include an interface device 212 (e.g., display), a portion of client (C2) 214, and a communication component 216. In some embodiments, the device 212 can be a component separate from the receiver 204 and connected to the receiver 204 through, for example, a wired link. Client (C2) 214 can be connected to device 212 through a wired link. Client (C2) 214 can be configured to process a packet received from transmitter 202. Receiver 204 can receive the communication from transmitter 202 through communication component 216 that can include, for example, a UWB modem.

System 200 can be configured to operate in one of two modes of operation. These modes include a low overhead mode and a low latency mode. In low overhead mode, client (C1) 208 places the data to be sent, excluding for example, fill packets and round trip delay packets, in a buffer that can be included on the communication component 210 (e.g., UWB modem). The communication component 210, through a UWB MAC, for example, can periodically request unidirectional channel time allocations (CTA) from transmitter 202 to receiver 204 based on the size of the buffer. In a reverse direction (e.g., reverse link), client (C2) 214 can place the reverse link data that it wants to send, excluding filler packets, for example, in a buffer associated with communication component 216 (e.g., UWB modem). In the reverse direction, the communication component 216 can request reverse-direction CTAs.

For low latency mode, during an initialization phase, communication component 210 (e.g., UWB modem) can request a CTA for m msec in the forward direction and a CTA for n msec in the reverse direction. The expected ratio of traffic in the forward and reverse, directions is m:n and m sec is the duration corresponding to a forward link transfer rate of $R_{f\text{-}mddi}$. T is a superframe duration, which is determined by the latency constraints of the application where:

$$(m+n) < T_{CTAP} < T$$

Figure 3:
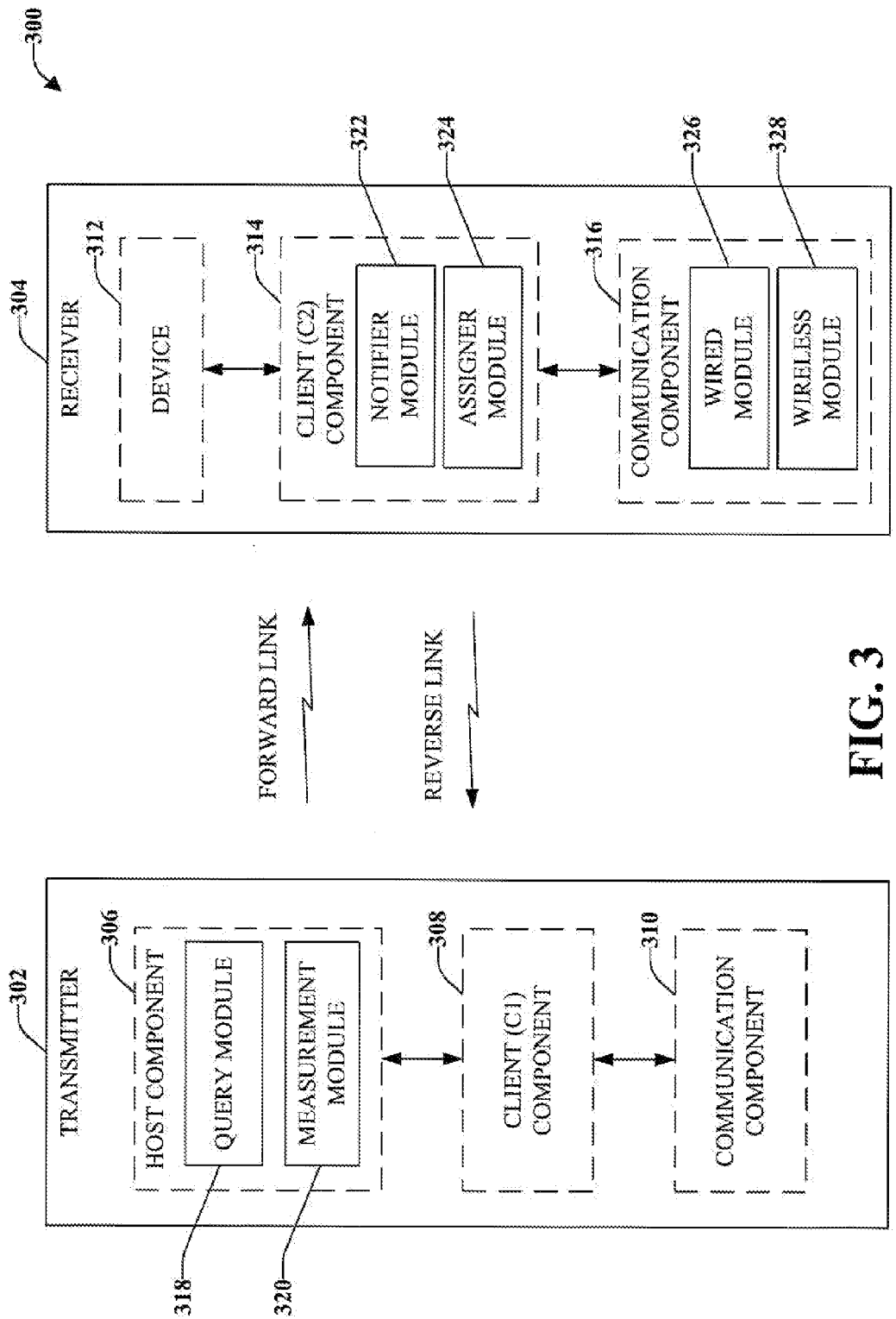
FIG. 3 illustrates a system for communicating through wired and/or wireless architectures.

With reference now to FIG. 3, illustrated is a system 300 for communicating through wired and/or wireless architectures. System 300 includes a transmitter 302 and a receiver 304 that communicate over a forward link (from transmitter 302) and/or a reverse link (from receiver 304). The communication over the forward link and/or reverse link can be over a wired protocol and/or over a wireless protocol depending on the particular situation (e.g., data to be transmitted, data rates, quality of communication link, status of each device, . . . ). Although a number of transmitter(s) 302 and receiver(s) 304 can be included in system 300, as will be appreciated, a single transmitter 302 that transmits communication data signals to a single receiver 304 is illustrated for purposes of simplicity.

Transmitter 302 can include a host component 306 connected to a client (C1) component 308 and a communication component 310. Receiver 304 can include a device 312 connected to a client (C2) component 314 and a communication component 316. Client (C1) component 308 and client (C2) component 314 are respective portions of a client.

It will be understood by persons having ordinary skill in the art that transmitter 302 and/or receiver 304 can include additional components. For example, transmitter 302 can include an encoder component (not shown) that can modulate and/or encode signals in accordance with a suitable wireless communication protocol which signals can then be transmitted to receiver 304. In some embodiments, encoder component can be a voice coder (vocoder) that utilizes a speech analyzer to convert analog waveforms into digital signals or another type of encoder. Suitable wireless communication protocols can include, but are not limited to, Orthogonal Frequency Division Multiplexing (OFDM), Orthogonal Frequency Division Multiplexing Access (OFDMA), Code Division Multiple Access (CDMA), Time Division Multiple Access (TDMA), Global System for Mobile Communications (GSM), High-Speed Downlink Packet Access (HSDPA), and the like.

Receiver 304 can include a decoder component (not shown) that can decode a received signal and/or data packet therein for processing. Upon successful decode of a data packet, an acknowledgment component (not shown) can generate an acknowledgment that indicates successful decode of the data packet, which can be sent to transmitter 302 to inform transmitter 302 that the data packet was received and decoded, and therefore need not be retransmitted.

Host component 306 can include a query module 318 and a measurement module 320. Query module 318 can be configured to query a host medium access control (MAC) for an application data rate that the MAC provides. For wireless communication, the operation rate may depend upon the rate of the wireless link. Measurement module 320 can be configured to determine the forward link rate and the reverse link rate based on, for example, a round trip delay measurement, which may be specified in the wireless protocol. In some embodiments, the wireless operation rate can be determined by the minimum of the two rates (forward link rate and reverse link rate), the maximum capacity of host 306, and the maximum capacity of client (C1) 308. There should be a minimum allowable rate $R_{min}$. If the measured operation rate is below this minimum allowable rate, the operation rate can be adjusted by transmitter 302 and/or receiver 304 through respective components (e.g., communication components 310 and/or 316). Transmitter 302 can notify receiver 304 the rate at which the communication will be processed.

Client (C2) component 314 can include a notifier module 322 that can be configured to notify transmitter 302 the application data rate that the MAC provides. Such notification can be based on a query received from transmitter 302 (e.g., a query sent by query module 318). For reverse link packets, notifier module 322 can specify the number of bytes needed by receiver 304 to send on the reverse link in the current frame. Client (C2) component 314 can also include an assigner module 324 that can be configured to assign a communication to a wired protocol or a wireless protocol depending on various parameters associated with a communication (e.g., communication type, rate of communication, sender, receiver, and the like).

Communication component 316 can include a wired module 326 and a wireless module 328. The wired module 326 can be configured to provide wired functionality and the wireless module 328 can be configured to provide wireless functionality. A determination can be made whether to communicate wirelessly utilizing the wireless module 328 or to communicate utilizing the wired module 326. Such a determination can be based on a variety of factors including the operation rate, the type of data being transmitted (e.g., voice, text, image, . . . ), the size of the data or files being transmitted, if the data is typically communicated over a wired link or a wireless link, etc. Wired module 326 and/or wireless module 328 can include a buffer for storing content so that if a change is made during a communication from one module to the other module (e.g., wireless to wired, wired to wireless) communication is not lost due to switchover issues.

Information about whether the receiver 304 is communicating over a wired link or wireless link does not need to be communicated to transmitter 302. Transmitter 302 performs its functions in substantially the same way regardless of the communication method (wired or wireless).

According to some embodiments, transmitter 302 can include a component configured to fragment a sub-frame (not shown) and receiver 304 can include a component configured to reassemble the sub-frame (not shown). The maximum length of an MDDI sub-frame, for example, can be about 65,536 bytes, although it is generally smaller. The maximum size of an 802.15.3 MAC frame can be approximately 4,096 or around 8,192 bytes, if the underlying rate is about 480 Mbps. The size can be around 2,048 bytes if the underlying physical layer rate is approximately 200 Mbps. Thus, the sub-frame may need to be fragmented on the transmitter 302 side and reassembled on the receiver 304 side to accommodate the size of the frame. Such fragmenting and reassembly can be performed by respective communication components 310 and 316 and/or other components associated with transmitter 302 and receiver 304.

Figure 4:
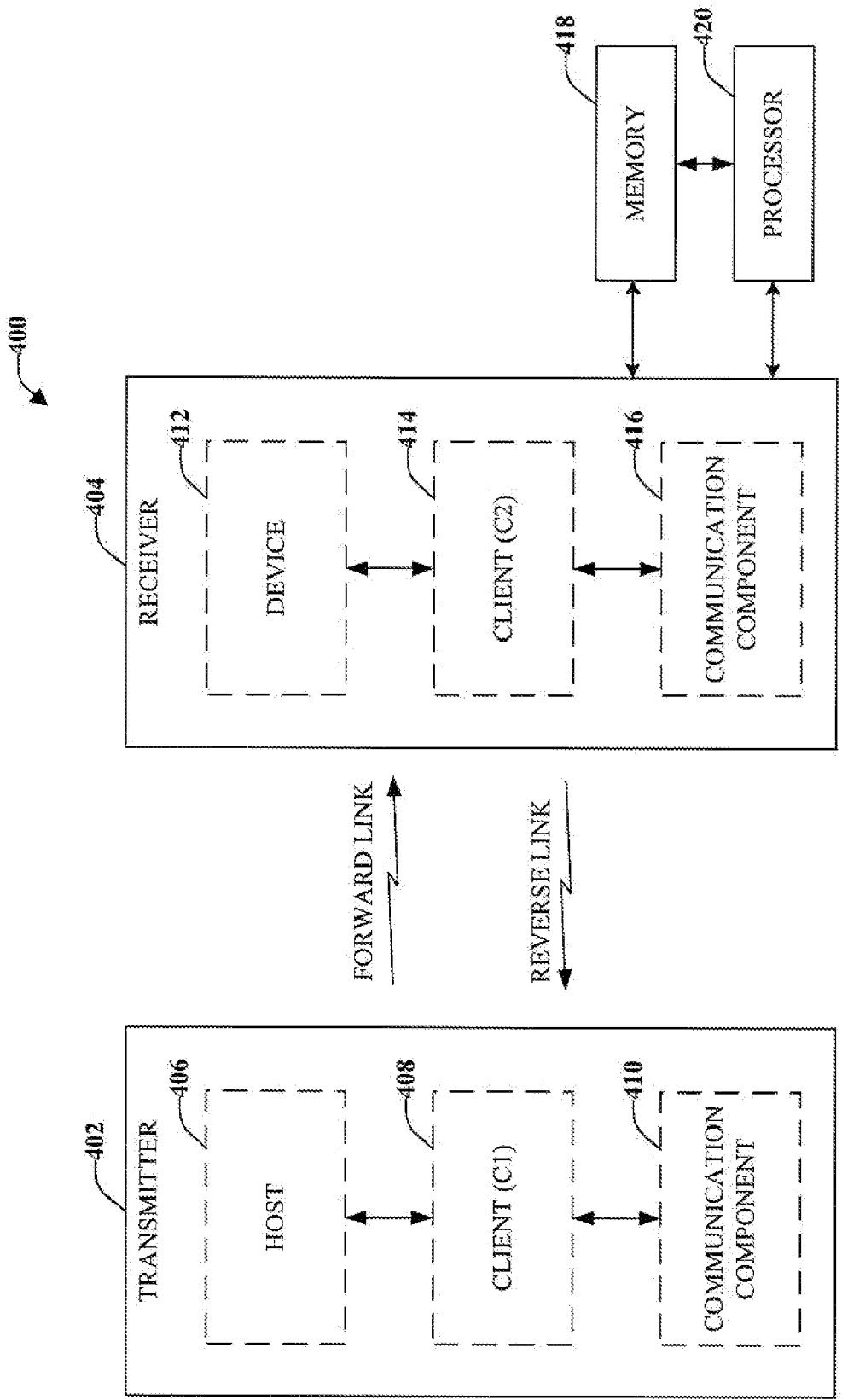
FIG. 4 illustrates another embodiment of a system for extending traditionally wired configurations to allow communication over a wireless link.

FIG. 4 illustrates another embodiment of a system 400 for extending traditionally wired configurations to allow communication over a wireless link. System 400 can include a transmitter 402 that includes a host 406, a portion of a client (C1) 408, and a communication component 410. System 400 can also include a receiver 404 that includes a device 412, a portion of a client (C2) 414, and a communication component 416. Transmitter 402 communicates to receiver 404 over a forward link and receiver 404 communicates to transmitter 402 over a reverse link. As noted previously with regard to the above figures, although a number of transmitter(s) 402 and receiver(s) 404 can be included in system 400, a single transmitter 402 that transmits communication data signals to a single receiver 404 is illustrated for purposes of simplicity.

System 400 can include a memory 418 operatively coupled to receiver 404. Memory 418 can store information related to a data rate for a packet and/or a packet type (e.g., application data rate provided by MAC, operation rate of the wireless link, . . . ). mode of operation for a packet and/or packet type, and/or other parameters associated with transmitting data over a wireless protocol, over a wired protocol, or a combination of these protocols. For example, a wired protocol can be used for a communication and a decision can be made to switch to a wireless protocol during the communication, or vice versa, without interruption or termination.

A processor 420 can be operatively connected to receiver 404 (and/or memory 418) to facilitate analysis of information related to ascertaining whether a particular communication should be sent over a wired protocol or a wireless protocol Processor 420 can be a processor dedicated to analyzing and/or generating information communicated to receiver 404, a processor that controls one or more components of system 400, and/or a processor that both analyzes and generates information received by receiver 404 and controls one or more components of system 400.

Memory 418 can store protocols associated with data communication rates, operation rates, taking action to control communication between receiver 404 and transmitter 402, etc., such that system 400 can employ stored protocols and/or algorithms to achieve improved communication in a wireless network as described herein. It should be appreciated that the data store (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPRGM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 418 of the disclosed embodiments are intended to comprise, without being limited to, these and other suitable types of memory.

Figure 5:
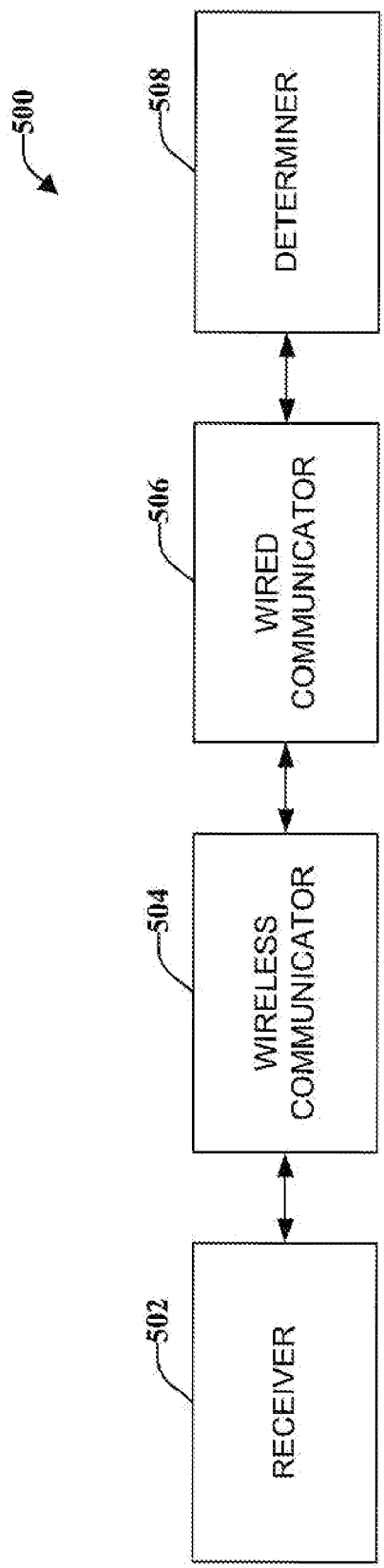
FIG. 5 illustrates a system for communicating over a wired link or a wireless link with a traditionally wired device.

FIG. 5 illustrates a system 500 for communicating over a wired link or a wireless link with a traditional wired device. System 500 is represented as functional blocks, which can be functional blocks that represent functions implemented by a processor, software or combination thereof (e.g., firmware). System 500 includes a receiver 502 that can be configured to receive an operation rate for a communication. This operation rate can be received from, for example, a sender or a sender host. The operation rate can set up or establish the rate of communication in both a forward direction and a reverse direction. System 500 also includes a wireless communicator 504 that can be configured to send and/or receive a communication over a wireless protocol. A wired communicator 506 can be configured to send and/or receive a communication over a wired protocol.

It should be noted that in a forward and/or a reverse direction there may be packet extensions and/or new packets. For example, in a forward direction MDDI sender information can be added to a packet. This packet extension can provide an MDDI client on the receiver end with MDDI sender side information. This information can include the rate at which the MDDI host and client should operate on the sender side. In the reverse direction, extensions to a client capability packet can include about four bytes for MDDI receiver MAC information and around two bytes for MDDI receiver client information, however other extensions are also possible.

Also included in system 500 is a determiner 508 that can selectively determine whether to utilize the wireless communicator to communicate over the wireless protocol or whether to utilize the wired communicator to communicate over the wired protocol. Such a determination can be selectively made based on various parameters, such as the communication operation rate. Other parameters can also be analyzed to make the determination. For example, the determination can be made based on how the particular communication has been traditionally sent and/or received (e.g., historical analysis), the type of communication (e.g., voice, image, text, . . . ), as well as other parameters relating to the communication, the sender, and/or the receiver.

Figure 6:
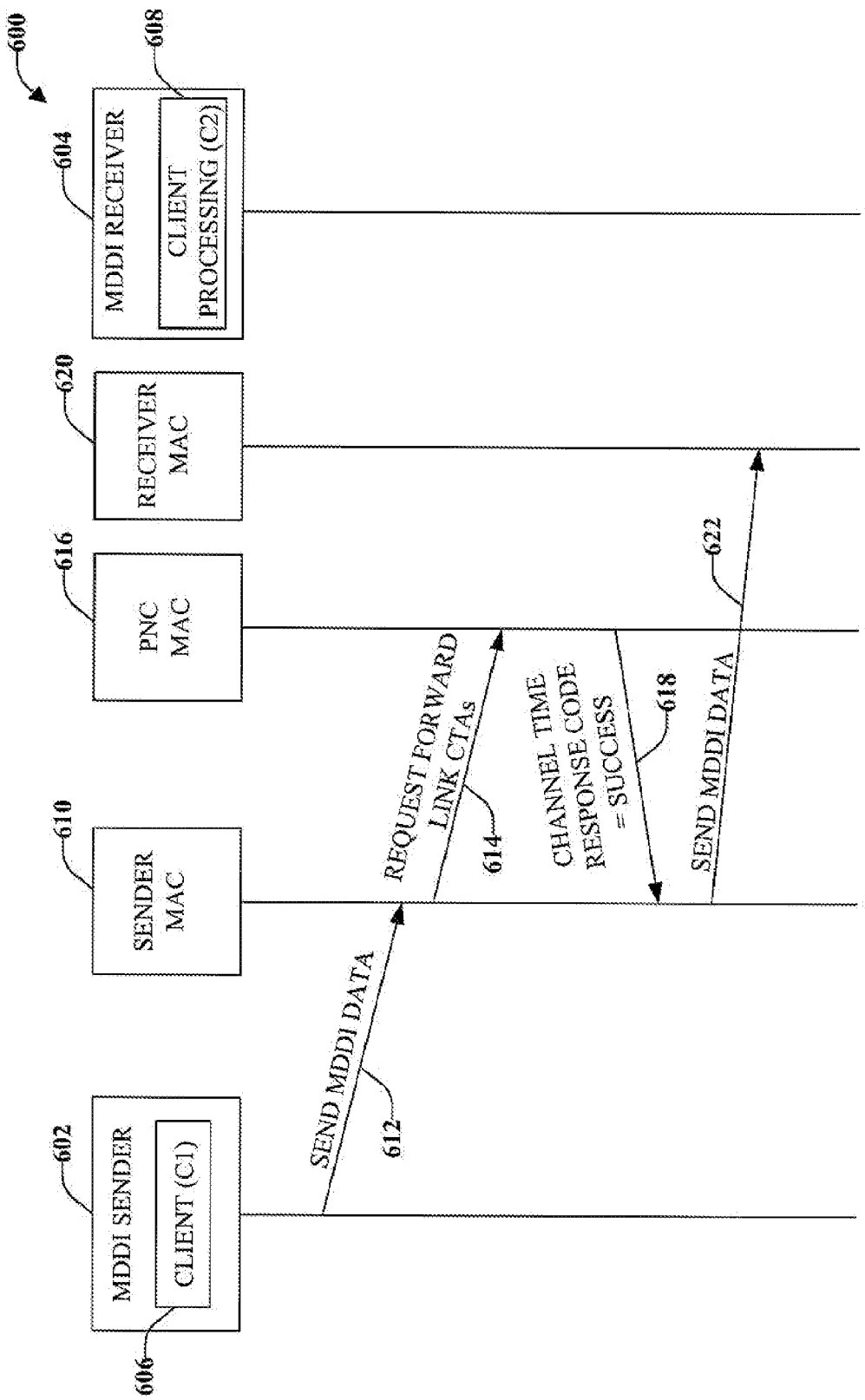
FIG. 6 illustrates an exemplary forward link MDDI data transfer in low-overhead mode in accordance with the various embodiments presented herein.

FIG. 6 illustrates an exemplary forward link MDDI data transfer 600 in low-overhead mode in accordance with the various embodiments presented herein. One type of mode for an MDDI sender 602 to send data to an MDDI receiver 604 can be a low overhead mode. In this mode, a packet sent wirelessly is optimized for channel allocation time, which is the time it takes for data to be sent from either direction (e.g., forward or reverse). MDDI sender 602 can include a portion of a client (C1) 606 and MDDI receiver 604 can include a portion of the client processing (C2) 608.

An MDDI client (C1) 606 can place the data to be sent in a buffer, such as on a UWB modem. The data to be sent should exclude unnecessary packets, such as fill packets and round trip delay packets, for example. The MDDI data is sent to a sender MAC 610, as illustrated at 612. Sender MAC 610 (or UWB MAC) may periodically or continuously request at least one CTA from MDDI sender 602 to MDDI receiver 604 based on, for example, the size of the buffer.

Sender MAC 610 can request, at 614, forward link CTAs (e.g., periodically or continuously) from a piconet controller (PNC) MAC 616. PNC MAC 616 can respond to sender MAC 610 with a channel time response code at 618. This response code can indicate whether the data has been communicated successfully. After a successful channel time response code is received, sender MAC 610 can send the MDDI data to a receiver MAC 620, as indicated at 622.

Figure 7:
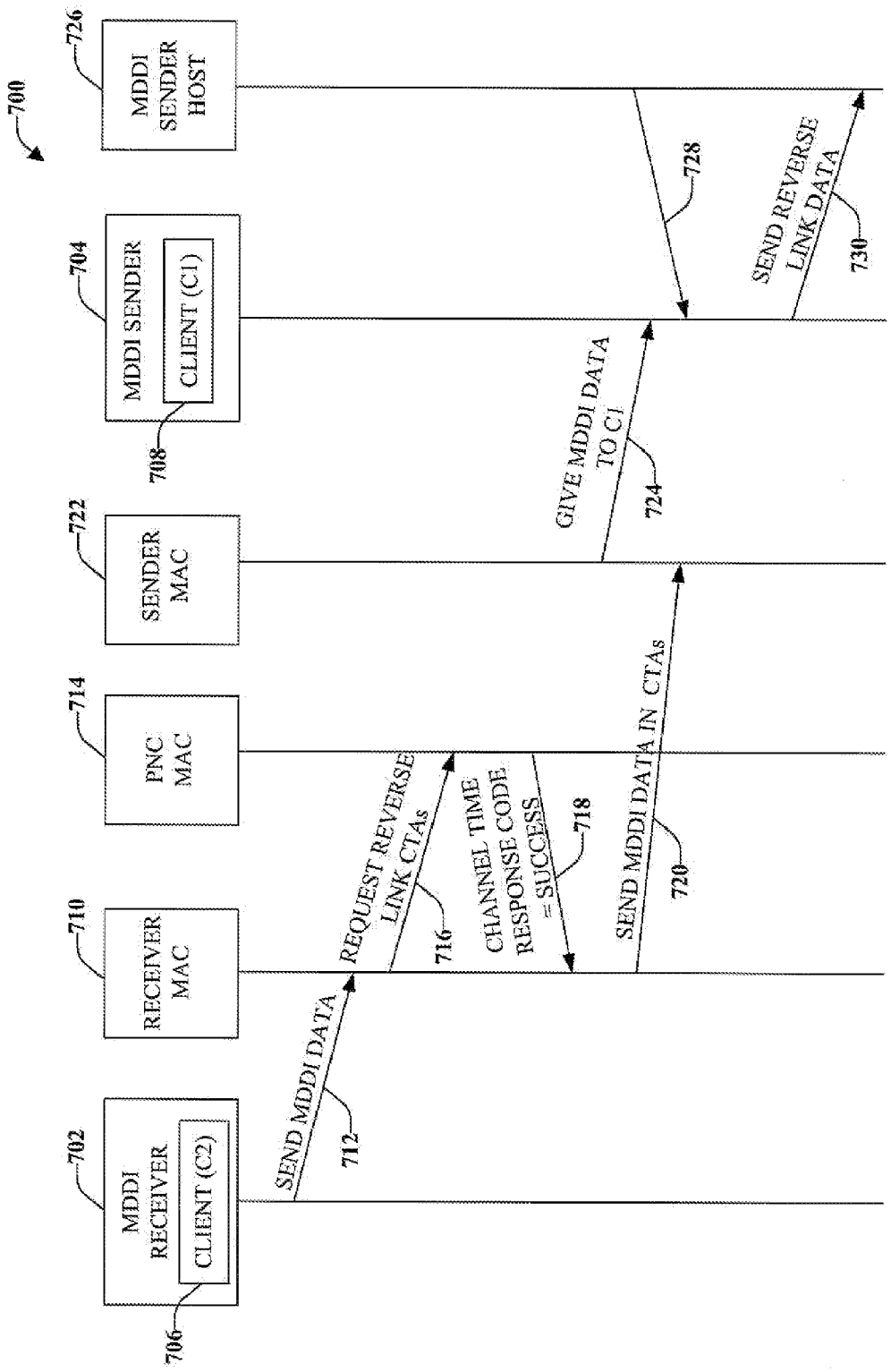
FIG. 7 illustrates an exemplary reverse link MDDI data transfer in low-overhead mode in accordance with the various embodiments presented herein.

FIG. 7 illustrates an exemplary reverse link MDDI data transfer 700 in low-overhead mode in accordance with the various embodiments presented herein. An MDDI receiver 702 can initiate, over a reverse link, communication intended for an MDDI sender 704. MDDI receiver 702 can include a portion of client (C2) 706 and MDDI sender 704 can include a portion of client (C1) 708.

MDDI receiver 702 can send MDDI data to a receiver MAC 710, as indicated at 712. Receiver MAC 710 can request from a PNC MAC 714 reverse link CTAs, at 716. The request can correspond to the data that should be sent in the reverse direction. PNC MAC 714 can respond, at 718, with a channel time response code. Receiver MAG 710 can, at 720, send MDDI data in CTAs to sender MAC 722. As indicated at 724, sender MAC 722 may have sent or given MDDI data to client (C1) 708 at some time before or at substantially the same time as receiving the MDDI data from receiver MAC 710. An MDDI sender host 726 can send and/or receive at least one reverse link encapsulation every frame, as indicated at 728 and 730. The reverse link data can be sent proactively, without waiting for a data request. The client can specify the number of bytes it needs to send on the reverse link in the current frame. The MDDI sender host 726 can correspondingly allocate the request in the reverse link encapsulation packet.

Figure 8:
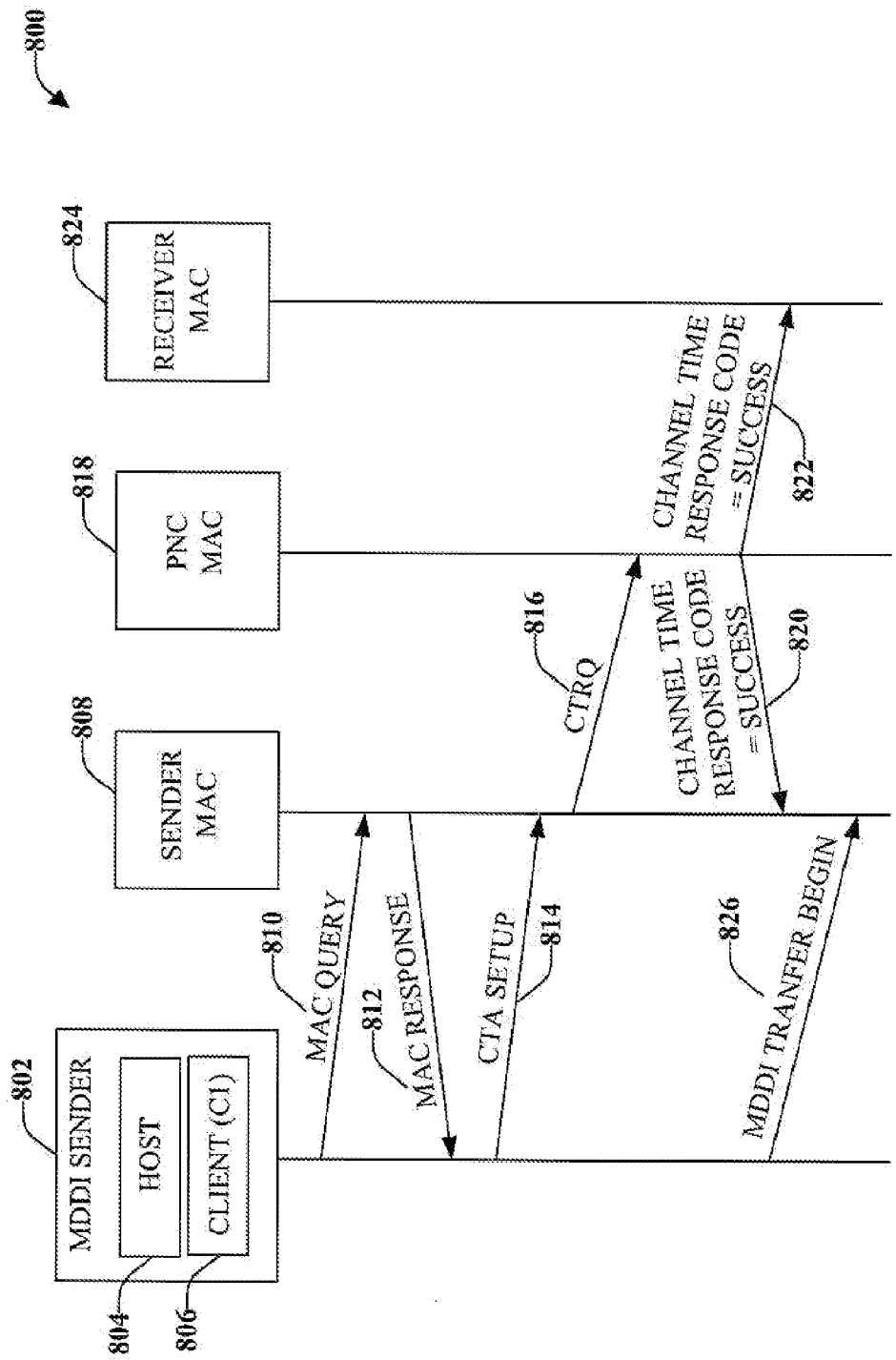
FIG. 8 illustrates a low-latency mode MDDI connection setup in accordance with the various embodiments presented herein.

FIG. 8 illustrates, a low-latency mode MDDI connection setup 800 in accordance with the various embodiments presented herein. In low-latency mode, channel allocation time can be ascertained based on an inference derived from data contained in packets in both the forward direction and the reverse direction. A MDDI sender 802 can include a host 804 and a portion of a client (C1) 806. During an initialization phase, a UWB modem on the sender 802 can send a MAC query, at 810, to a sender MAC 808. A MAC query is a query sent to find out the rate supported by the MAC and retransmission statistics. Sender MAC 808 can respond to the query at 812. This response can be a MAC response that indicates the rate supported by the MAC retransmission statistics.

Sender 802 requests a CTA setup 814 for m msec in the forward direction and a CTA for n msec in the reverse direction. The expected ratio of traffic in the forward and reverse directions should be m:n. At 816, a channel time request (CTRq) is sent to a PNC MAC 818. A channel time response code can be sent in the reverse direction, shown at 820, and in the forward direction, shown at 822 and sent to a receiver MAC 824. MDDI sender 802 can begin an MDDI transfer, as illustrated at 826.

The duration corresponding to the MDDI forward link transfer rate of $R_{f\text{-}mddi}$ is m sec, and when T is the super-frame duration determined by the latency constraints of the application, the following formula applies:

$$m+n<T_{CTAP}<T$$

In the low latency mode, the reverse link data can be sent during the CTAs reserved in the reverse direction. Depending on the time of arrival of reverse link data in relation to the MAC super frame, the transfer can have a maximum latency expressed as:

$$T_{rl}=ceil[\{k*(N/R_1+RIFS+H/R_2)+SIFS+T_{ACK}\}/n]*T$$

where k is the average number of retransmissions experienced by a MAC frame. N is the size of the reverse link packet that should be sent and n is the reverse link CTA duration in each super frame. $R_1$ is the physical layer transmission rate of the MDDI data (MAC payload). $R_2$ is the physical layer transmission rate of the PHY, MAC headers and the preamble. H is the size of the MAC plus the size of the PHY header plus the size of the preamble. SIFS is the short interframe spacing duration. RIFS is the retransmission interframe spacing duration. $T_{ACK}$ is the duration of transmission of the ACK. T is the super-frame duration. For explanation purposes, it is assumed that the ACK policy is Imm-ACK. The latency of the forward link packets, $T_{fl}$, can be determined accordingly. Given the application latency constraints in forward and reverse links, the time duration of the MAC frame can be derived accordingly. For example, various algorithms, methods, and/or techniques can be employed to derive the time duration of the MAC frame and/or the latency of the forward link packets.

In view of the exemplary systems shown and described above, methodologies, which may be implemented in accordance with one or more embodiments presented herein, will be better appreciated with reference to the diagram of FIGS. 9-12. While, for purposes of simplicity of explanation, the methodologies are shown and described as a series of acts (or function, blocks), it is to be understood and appreciated that the methodologies are not limited by the order of acts, as some acts may, in accordance with these methodologies, occur in different orders and/or concurrently with other acts from that shown and described herein. Moreover, not all illustrated acts may be required to implement the following methodologies. It is to be appreciated that the various acts may be implemented by software, hardware, a combination thereof or any other suitable means (e.g. device, system, process, component) for carrying out the functionality associated with the acts. It is also to be appreciated that the acts are merely to illustrate certain aspects presented herein in a simplified form and that these aspects may be illustrated by a lesser and/or greater number of acts. Those skilled in the art will understand and appreciate that a methodology could alternatively be represented as a series of interrelated states or events, such as in a state diagram.

Figure 9:
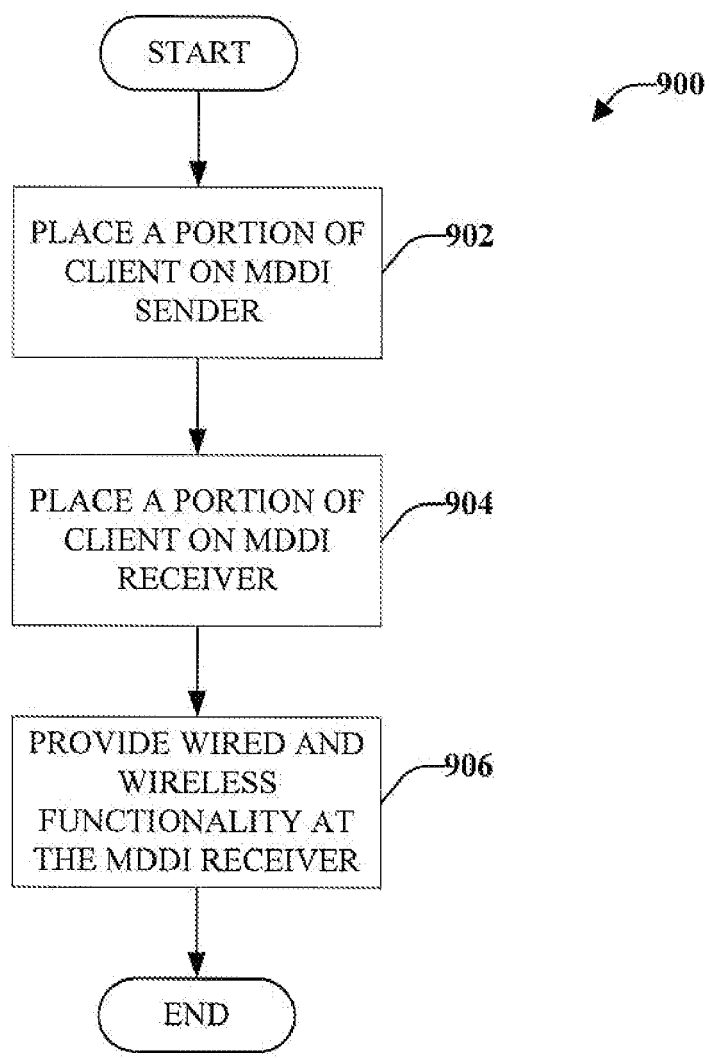
FIG. 9 illustrates a methodology for configuring a traditionally wired device to communicate through a wired protocol and/or a wireless protocol.

With reference now to FIG. 9, illustrated is a methodology 900 for configuring a traditionally wired device to communicate through a wired protocol and/or a wireless protocol. At 902, a first portion of a client is placed on an MDDI sender. The MDDI sender can be wireless and can be connected to a data source. The MDDI sender can also include an MDDI host connected or interfaced to the client portion by, for example, a traditional wired MDDI link.

At 904, a second portion of the client is placed on an MDDI receiver, which can be a wireless MDDI receiver. The MDDI receiver can be connected to a device, which can be, for example, a display. The portion of the client placed on the MDDI sender and the portion of the client placed on the MDDI receiver are distinct portions of the same client. It should be noted that the respective portions of the client can be portions implemented by a processor, software or combination thereof (e.g., firmware).

Both a wired functionality and a wireless functionality are provided, at 906. This functionality is included on the MDDI receiver, enabling the MDDI receiver to communicate through the wired functionality, the wireless functionality, or both functionalities.

By way of example and not limitation, an MDDI receiver can be a mobile device that may receive a communication, such as a movie that is displayed on a CRT screen or display. The mobile device may also be connected to a wall-mounted display, allowing the movie to be displayed on the wall so that others can view the imagery. If the mobile device is multifunctional, it can broadcast the movie on the display and can at substantially the same time receive or send a voice communication, different from the voice communication associated with the movie. Thus, a user of the mobile device may conduct a communication separate from the movie. An example where this might be utilized is when a user's children are watching a movie and the user wants to answer the phone and walk away. Thus, the movie can be displayed through a wired functionality and at substantially the same time the user can communicate through the wireless functionality.

Figure 10:
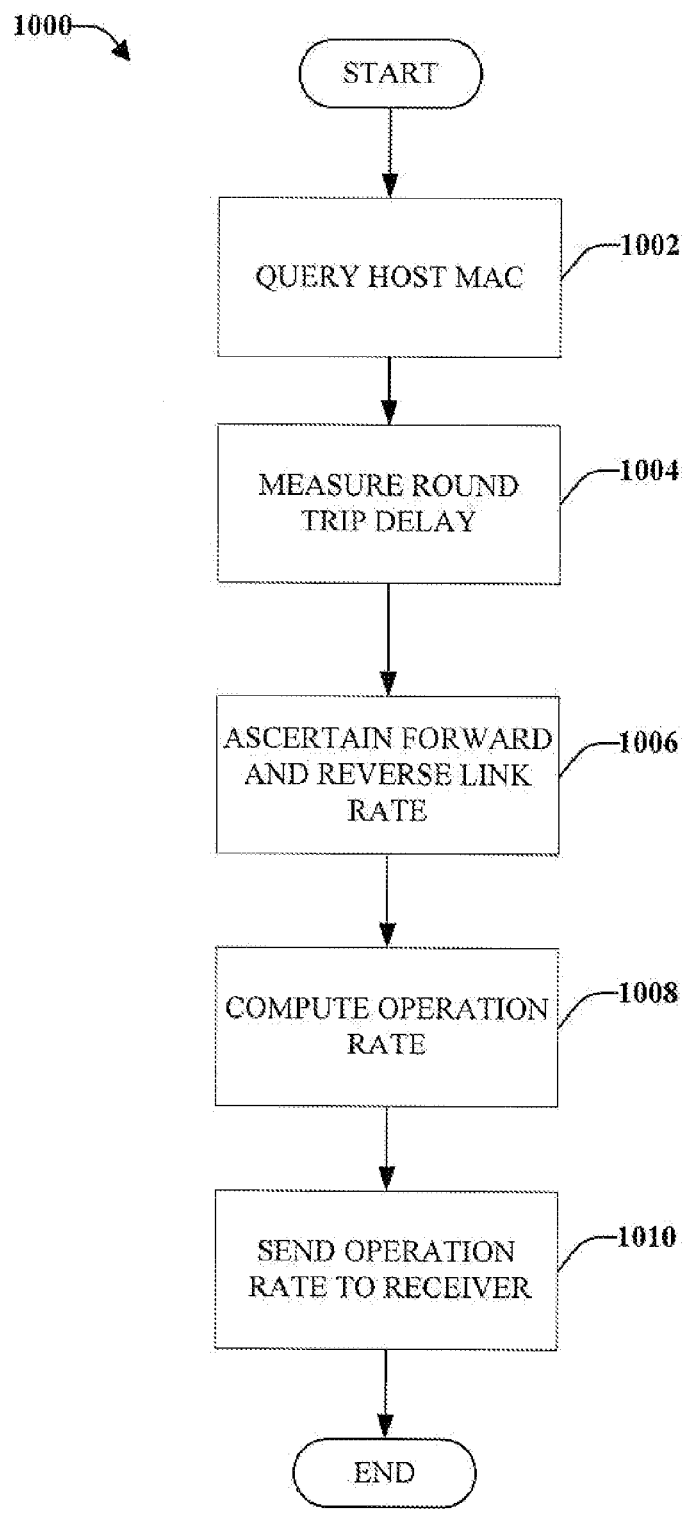
FIG. 10 illustrates a methodology for determining an operation rate according to the one or more disclosed embodiments.

FIG. 10 illustrates a methodology 1000 for determining an operation rate according to the one or more disclosed embodiments. In a wireless MDDI, for example, the MDDI operation rate depends, in part, on the rate of the wireless link. The method 1000 for determining an operation rate begins, at 1002, where a host MAC is queried for an available application data rate (e.g., the application data rate that the MAC provides). The query can be requested by an MDDI host, for example.

At 1004, a round trip delay is measured. The round trip delay measurement can be utilized, at 1006, to determine or ascertain a forward link rate and a reverse link rate. According to some embodiments, the round trip delay measurement can be specified in a wired MDDI protocol that should be used.

An operation rate is computed at 1008. The operation rate can be computed based in part by comparing the forward link rate and the reverse link rate and determining which is the minimum of the two rates. The minimum of these two rates can be designated as the operation rate. In some embodiments, the minimum of these two rates (forward link rate and reverse link rate) can further be compared to both the maximum capacity of an MDDI host and the maximum capacity of an MDDI client (C1). The minimum or lowest rate based on this comparison is assigned as the operation rate.

There should be a minimum allowable rate $R_{min}$, which can be established or predetermined based on communication parameters. If the computed operation rate is lower than the minimum allowable rate, adjustments can be made to increase the rate. At 1010, the operation rate is communicated or sent to a receiver (e.g., MDDI receiver) to notify the receiver the rate at which the communication will proceed.

In the above methodology 1000, for example, a transmitter can query the host MAC through a query module. The transmitter can further measure the round trip delay, ascertain forward and reverse link rate, and compute the operation rate utilizing a measurement module. The transmitter can also send the operation rate to the receiver utilizing a communication component. It should be understood that the above are for example purposes only and other components can be utilized in connection with the one or more embodiments presented herein.

Figure 11:
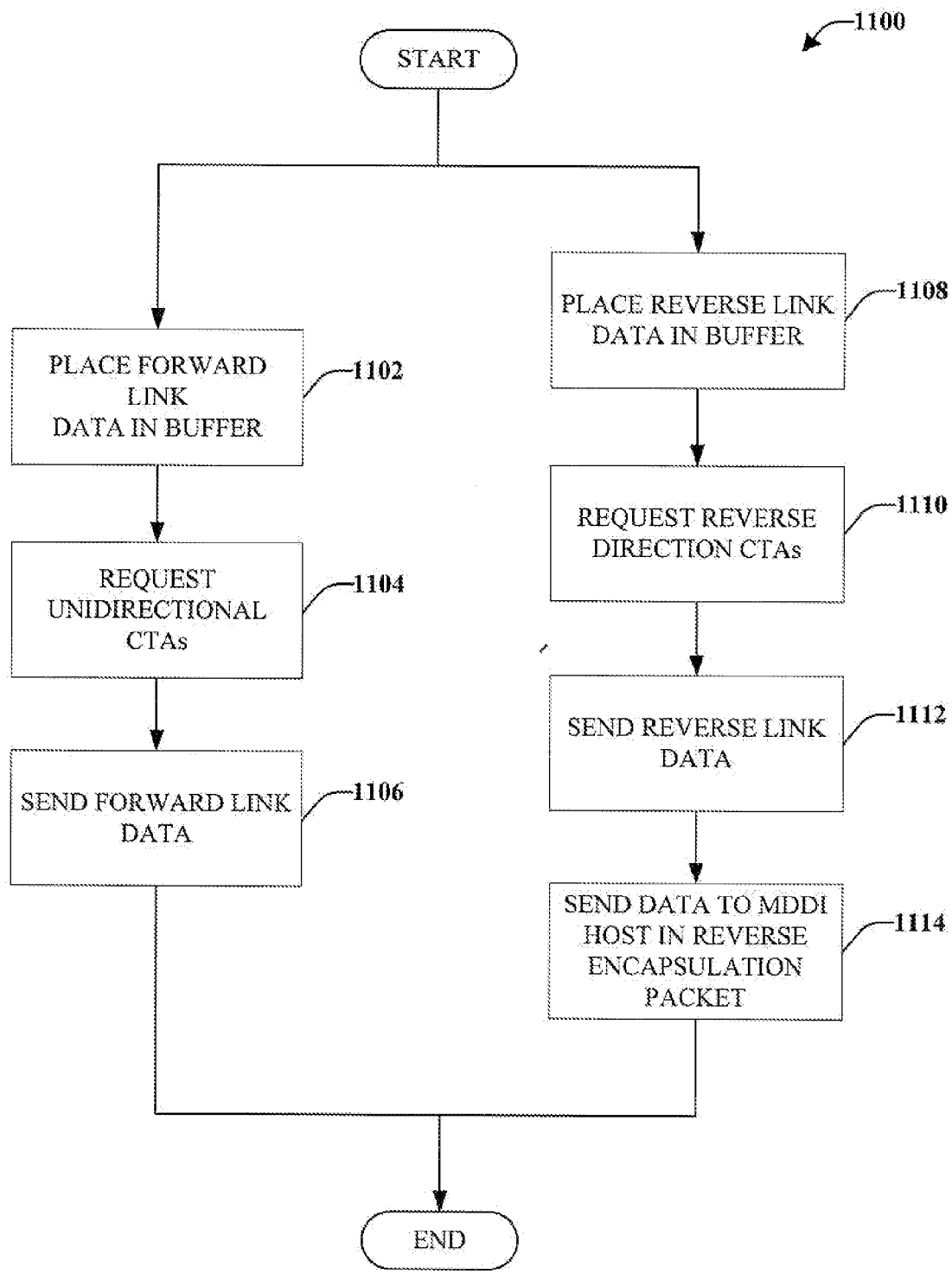
FIG. 11 illustrates a methodology for communicating in low overhead mode according to the various embodiments presented herein.

Referring now to FIG. 11, illustrated is a methodology 1100 for communicating in low overhead mode according to the various embodiments presented herein. The forward link is shown on the left side of the figure and the reverse link is shown on the right side of the figure.

At 1102, forward link data is placed in a buffer. Excluded from the data placed in the buffer can be unnecessary data such as fill packets and/or round trip delay packets. This data can be placed in the buffer by an MDDI client (C1) on an MDDI sender, for example. At 1104, unidirectional CTAs are requested (e.g., periodically or continuously). A UWB MAC can request this information from the MDDI sender to a receiver based on, for example, the size of the buffer. The forward link data can be sent, at 1106.

In the reverse direction, a host sends at least one reverse link encapsulation packet every frame. A client (e.g., receiver) can specify the number of bytes that should be sent on the reverse link in the current frame. The host (e.g., sender) can allocate the request in a reverse link encapsulation packet. At 1108, reverse link data that should be sent is placed in a buffer by, for example, an MDDI client (C2). The buffer can be located on a UWB modem of an MDDI receiver. A request for reverse direction CTAs is sent, at 1110, by, for example, a UWB modem on the MDDI receiver side. The request can be for those CTAs in the reverse direction corresponding to the data that should be sent in the reverse direction.

An MDDI client on the receiver (C2) can send reverse link data to the client on the sender (C1) proactively, at 1112. As illustrated, at 1114, an MDDI client on the sender (C1) sends the data it has to the MDDI host in the reverse encapsulation packet.

Figure 12:
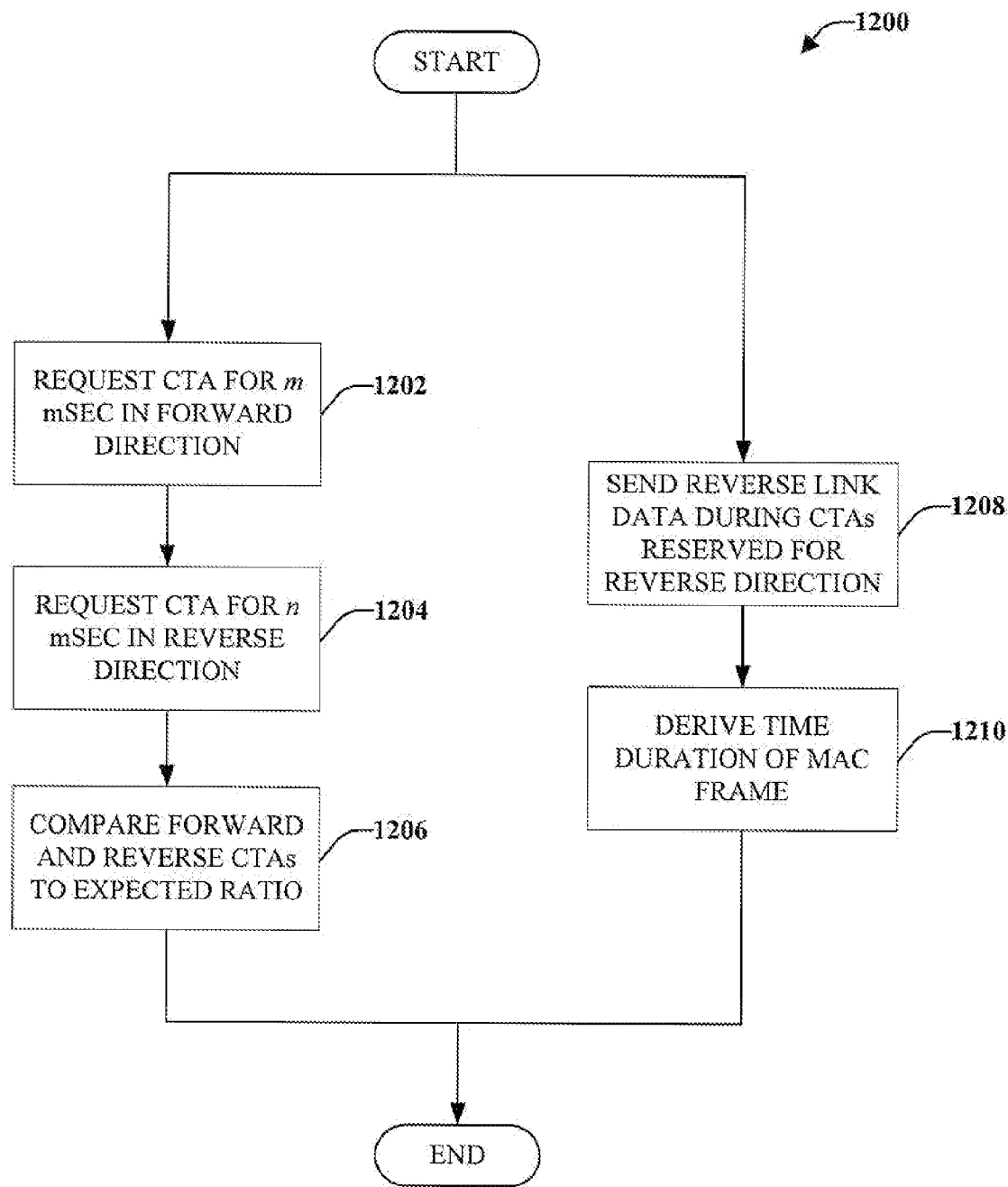
FIG. 12 illustrates a methodology for communicating in low latency mode according to the various embodiments presented herein.

FIG. 12 illustrates a methodology 1200 for communicating in low latency mode according to the various embodiments presented herein. The forward link is shown on the left side of the figure and the reverse link is shown on the right side of the figure. During an initialization phase in low latency mode, a UWB modem on the sender, for example, requests, at 1202, a CTA for m msec in the forward direction. At 1204, a CTA request for n msec is sent in the reverse direction. A comparison of the forward and reverse CTAs received in response to the requests is made, at 1206. The expected ratio of traffic in the forward and reverse directions is m:n. It should be noted that m msec is the duration corresponding to the MDDI forward link transfer rate of $R_{f-mddi}$ and:

$$(m+n) < T_{CTAP} < T$$

where T is the super-frame duration, which can be determined by the latency constraints of the application.

In the reverse direction during a low latency mode, the reverse link data is sent, at 1208, during the CTAs reserved in the reverse direction. At 1210, a time duration of the MAC frame can be derived from the application latency constraints in the forward and reverse links. In the following equation, k is the average number of retransmissions experienced by a MAC frame. N is the size of the reverse link packet that should be sent and n is the reverse link CTA duration in each super frame. $R_1$ is the physical layer transmission rate of the MDDI data (MAC payload). $R_2$ is the physical layer transmission rate of the PHY, MAC headers and the preamble. H is the size of the MAC and the size of PHY header and the size of the preamble. SIFS is the short inter-frame spacing duration. RIFS is the retransmission inter-frame spacing duration. $T_{ACK}$ is the duration of transmission of the ACK and T is the super-frame duration. For explanation purposes, it is assumed that the ACK policy is Imm-ACK. The latency of the forward link packets, $T_{fl}$, can be determined accordingly utilizing various algorithms, methods, and/or techniques. Depending on the time of arrival of reverse link data in relation to the MAC super frame, the transfer can have a maximum latency expressed as:

$$T_{r1} = \text{ceil}[\{k^*(N/R_1 + RIFS + H/R_2) + SIFS + T_{ACK}\}/n]^*T$$

Figure 13:
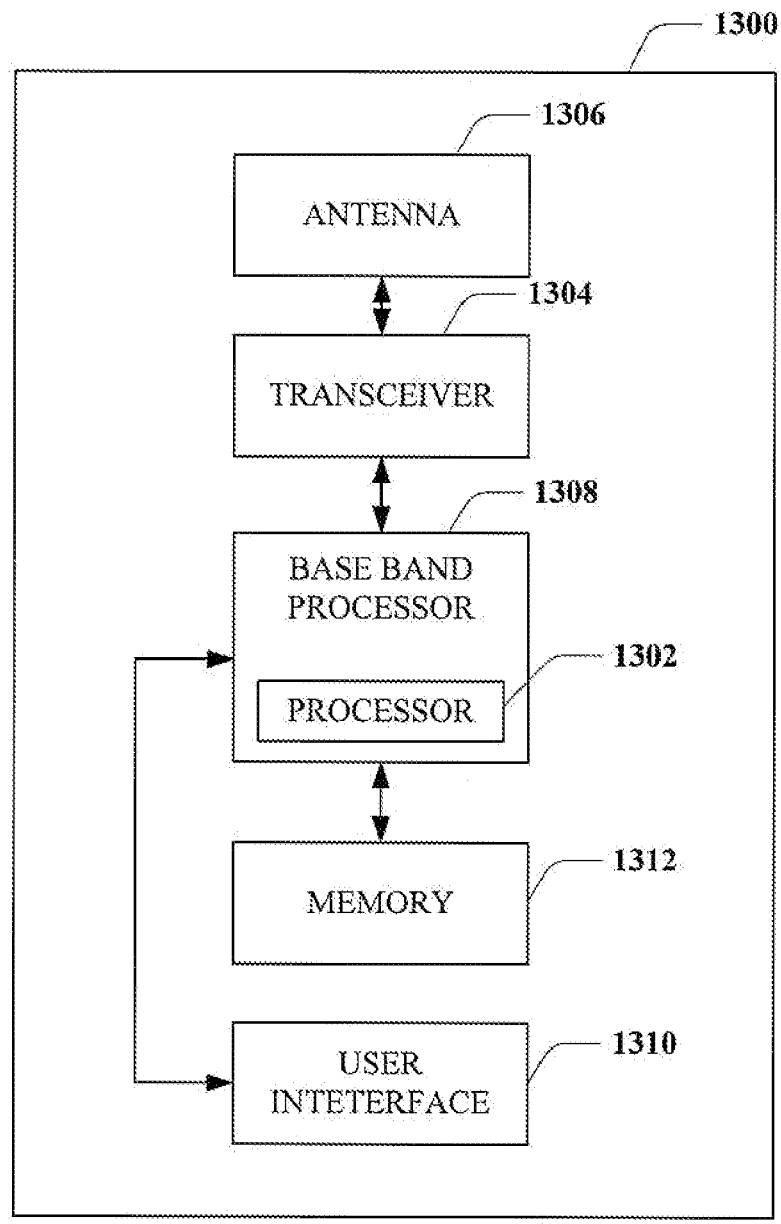
FIG. 13 illustrates a conceptual block diagram of a possible configuration of a terminal.

With reference now to FIG. 13, illustrated is a conceptual block diagram of a possible configuration of a terminal 1300. As those skilled in the art will appreciate, the precise configuration of the terminal 1300 may vary depending on the specific application and the overall design constraints. Processor 1302 can implement the systems and methods disclosed herein.

Terminal 1300 can be implemented with a front-end transceiver 1304 coupled to an antenna 1306. A base band processor 1308 can be coupled to the transceiver 1304. The base band processor 1308 can be implemented with a software based architecture, or other type of architectures. A microprocessor can be utilized as a platform to run software programs that, among other functions, provide control and overall system management function. A digital signal processor (DSP) can be implemented with an embedded communications software layer, which runs application specific algorithms to reduce the processing demands on the microprocessor. The DSP can be utilized to provide various signal processing functions such as pilot signal acquisition, time synchronization, frequency tracking, spread-spectrum processing, modulation and demodulation functions, and forward error correction.

Terminal 1300 can also include various user interfaces 1310 coupled to the base band processor 1308. User interfaces 1310 can include a keypad, mouse, touch screen, display, ringer, vibrator, audio speaker, microphone, camera and/or other input/output devices.

The base band processor 1308 comprises a processor 1302. In a software-based implementation of the base band processor 1308, the processor 1302 may be a software program running on a microprocessor. However, as those skilled in the art will readily appreciate, the processor 1302 is not limited to this embodiment, and may be implemented by any means known in the art, including any hardware configuration, software configuration, or combination thereof, which is capable of performing the various functions described herein. The processor 1302 can be coupled to memory 1312 for the storage of data.

It is to be understood that the embodiments described herein may be implemented by hardware, software, firmware, middleware, microcode, or any combination thereof. When the systems and/or methods are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

What has been described above includes examples of one or more embodiments. It is, of course, not possible to describe every conceivable combination of components or methodologies for purposes of describing these embodiments, but one of ordinary skill in the art may recognize that many further combinations and permutations of such embodiments are possible. Accordingly, the embodiments described herein are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A method for determining an operation rate for transferring data traditionally sent by a wired link over a high-speed wireless link, the method being performed by a transmitter, the method comprising:
   receiving an application data rate that a medium access control (MAC) layer supports from a receiver, with which the transmitter can communicate using a wireless or wired link, in response to sending a query to find out the application data rate;
   measuring a round trip delay;
   ascertaining a forward link rate and a reverse link rate based on the measured round trip delay;
   comparing the forward link rate and the reverse link rate to determine a minimum rate; and
   assigning the minimum rate as an operation rate, for both forward and reverse links.

2. The method of claim 1, further comprising communicating the operation rate to the receiver.

3. The method of claim 1, further comprising:
   determining whether the forward link rate or the reverse link rate is a lower rate; and
   designating the lower rate as the operation rate.

4. The method of claim 1, wherein the transmitter comprises a host component connected to a client component, and further comprising:
   comparing the forward link rate, the reverse link rate, the application data rate, a maximum capacity of the host component, and a maximum capacity of the client component to determine a lowest rate; and
   assigning the lowest rate as the operation rate, for both forward and reverse links.

5. The method of claim 4, further comprising:
   establishing a minimum allowable rate; and
   adjusting the operation rate if it is below the minimum allowable rate.

6. A method for configuring a traditionally wired device to communicate either through a wired protocol or through a wireless protocol, comprising:
   placing a first portion of a client on a sender;
   placing a second portion of the client on a receiver;
   providing wired functionality and wireless functionality at the receiver;
   comparing a forward link rate and a reverse link rate to determine a minimum rate; and
   assigning the minimum rate as a data rate, for both forward and reverse links;
   wherein the receiver selectively determines whether to utilize a wireless link, at the data rate received from the sender, or a wired link based in part on the data rate, wherein the receiver further determines whether to switch between the wireless and the wired link.

7. The method of claim 6, further comprising:
   connecting the sender to a data source; and
   interfacing the first portion of the client to a host included on the sender with a wired link.

8. The method of claim 6, further comprising connecting the receiver to a display.

9. The method of claim 6, wherein the first portion of the client and the second portion of the client are distinct portions of a same client.

10. An apparatus for communicating wirelessly over a traditional wired link, comprising:
    a transmitter comprising a host and a first portion of a client, wherein the host and the first portion of the client are connected by a wired link; and
    a receiver comprising a second portion of the client, wherein the receiver selectively determines whether to utilize a wireless link, at a data rate received from the transmitter, or the wired link based in part on the data rate;
    wherein the transmitter compares a forward link rate and a reverse link rate to determine a minimum rate;
    wherein the transmitter assigns the minimum rate as the data rate, for both forward and reverse links; and
    wherein the receiver further determines whether to switch between the wireless and the wired link.

11. The apparatus of claim 10, wherein the host of the transmitter comprises:
    a query module that determines the data rate based in part on a rate supported by a medium access control and a retransmission statistic; and
    an assigner module that assigns a communication to a wired protocol or a wireless protocol.

12. The apparatus of claim 11, wherein the data rate is also determined based on a rate of the wireless link.

13. The apparatus of claim 10, wherein the second portion of the client comprises a notifier module that sends a notification of an application data rate.

14. The apparatus of claim 10, wherein the transmitter is connected to a data source and the receiver is connected to an interface device.

15. The apparatus of claim 10, wherein the transmitter and receiver operate in one of a low overhead mode and a low latency mode.

16. A mobile device for communicating over a wired link or a wireless link, comprising:
    means for receiving, from a transmitter, a data rate for a communication;
    means for communicating over a wireless link;
    means for determining whether the data rate is below a minimum allowable rate and adjusting the data rate when the data rate is below the minimum allowable rate;
    means for communicating over a wired link; and
    means for selectively determining whether to utilize the wireless link, at the data rate, or the wired link based in part on the data rate, wherein the means for selectively determining comprises means for determining whether to switch between the wireless link and the wired link.

17. The mobile device of claim 16, wherein the switch between the wireless link and the wired link occurs during a single communication.

18. The method of claim 1, further comprising communicating using a low overhead mode, the communicating comprising:
    placing forward link data in a buffer;
    requesting unidirectional channel time allocations (CTAs) based on a size of the buffer; and
    sending the forward link data.

19. A method for communicating over a wired link or a wireless link, comprising:
    receiving, from a transmitter, a communication data rate;
    determining whether the communication data rate is below a minimum allowable rate and adjusting the communication data rate when the communication data rate is below the minimum allowable rate; and
    selectively determining whether to utilize a wireless link, at the communication data rate, or a wired link based in part on the communication data rate, wherein the selectively determining comprises determining whether to switch between the wireless link and the wired link.

20. The method of claim 1, further comprising communicating using a low latency mode, comprising:
    requesting a CTA for m msec in a forward direction;
    requesting a CTA for n msec in a reverse direction; and
    comparing the forward direction CTA to the reverse direction CTA.

21. The method of claim 19, further comprising communicating using a low latency mode, comprising:
    sending reverse link data during CTAs reserved for a reverse direction; and
    deriving a time duration of a medium access control frame.

22. A non-transitory computer readable medium comprising computer-executable instructions for:
    receiving, at a transmitter, an application data rate that a medium access control (MAC) layer supports from a receiver, with which the transmitter can communicate using a wireless or wired link, in response to sending a query to find out the application data rate;
    calculating a round trip delay;
    determining a forward link rate and a reverse link rate based in part on the calculated round trip delay;
    comparing the forward link rate and the reverse link rate to determine a minimum rate; and
    assigning the minimum rate as an operation rate, for both forward and reverse links.

23. The computer readable medium of claim 22, further comprising computer-executable instructions for sending the operation rate to a receiver.

24. The computer readable medium of claim 22, further comprising computer-executable instructions for:
    determining a lowest rate of the forward link rate, the reverse link rate, the application data rate, and a maximum capacity of a client;
    designating the determined lowest rate as the operation rate; and
    sending the operation rate to a receiver.

25. A processor that executes instructions for communicating over a wired link or a wireless link, the instructions comprising:
    receiving, from a transmitter, a communication data rate;
    determining whether the communication data rate is below a minimum allowable rate and adjusting the communication data rate when the communication data rate is below the minimum allowable rate; and
    selectively determining whether to communicate over a wired link, at the communication data rate, or a wireless link based in part on the communication data rate, wherein the selectively determining comprises determining whether to switch between the wireless link and the wired link.

26. The method of claim 19, further comprising communicating using a low overhead mode, comprising:
    placing reverse link data in a buffer;
    requesting reverse direction CTAs;
    sending reverse link data; and
    communicating data to a host in a reverse encapsulation packet.

* * * * *